(12) United States Patent
Dandayuthapani et al.

(10) Patent No.: US 11,996,930 B2
(45) Date of Patent: May 28, 2024

(54) TRAFFIC MANAGEMENT ARCHITECTURE

(71) Applicant: ARRIS Enterprises LLC, Suwanee, GA (US)

(72) Inventors: Sunil Dandayuthapani, Bangalore (IN); Sigurd Campbell, Phoenix, AZ (US); Manit Tusharbhai Trivedi, Ahmedabad (IN); Vijay Kumar Gupta, Austin, TX (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/076,873

(22) Filed: Dec. 7, 2022

(65) Prior Publication Data

US 2023/0116502 A1 Apr. 13, 2023

Related U.S. Application Data

(63) Continuation of application No. 17/348,430, filed on Jun. 15, 2021, now Pat. No. 11,705,978.

(30) Foreign Application Priority Data

Aug. 22, 2020 (IN) .............................. 202031036244

(51) Int. Cl.
*H04H 60/29* (2008.01)
*H04H 20/78* (2008.01)
(Continued)

(52) U.S. Cl.
CPC ............ *H04H 60/29* (2013.01); *H04H 20/78* (2013.01); *H04L 43/062* (2013.01); *H04L 43/065* (2013.01)

(58) Field of Classification Search
None
See application file for complete search history.

(56) References Cited

U.S. PATENT DOCUMENTS

| 8,239,506 B2 | 8/2012 | Danforth |
| 9,241,047 B2 | 1/2016 | Chow et al. |
| (Continued) | | |

FOREIGN PATENT DOCUMENTS

WO 2017/096791 6/2017

OTHER PUBLICATIONS

International Search Report and Written Opinion Re: Application No. PCT/US2021/037457 (dated Aug. 31, 2021).

*Primary Examiner* — James R Marandi
(74) *Attorney, Agent, or Firm* — Wenderoth, Lind & Ponack, L.L.P.

(57) ABSTRACT

A cable distribution system includes a head end connected to a plurality of customer devices through a transmission network that provides data suitable for the plurality of customer devices. A traffic monitoring system receives from a customer support device a first data request for a parameter of one of the plurality of customer devices. The traffic monitoring system provides a second data request for the parameter of the one of said plurality of customer devices to a customer premise equipment management system in response to receiving the first data request. The traffic monitoring system receiving a first data response including the parameter from the customer premise equipment management system in response to providing the second data request to the customer premise equipment management system. The traffic monitoring system providing a second data response including the parameter from the traffic management system to the customer support device in response to receiving the first data response.

20 Claims, 18 Drawing Sheets

(51) Int. Cl.
*H04L 43/062* (2022.01)
*H04L 43/065* (2022.01)

(56) References Cited

U.S. PATENT DOCUMENTS

| | | |
|---|---|---|
| 11,036,518 B1 | 6/2021 | Marudi |
| 2008/0028391 A1 | 1/2008 | Nallipogu |
| 2013/0081142 A1 | 3/2013 | McDougal |
| 2013/0111535 A1 | 5/2013 | Howe et al. |
| 2013/0151893 A1 | 6/2013 | Gorecha et al. |
| 2015/0288733 A1 | 10/2015 | Mao |
| 2017/0269883 A1 | 9/2017 | Nakai |
| 2018/0013606 A1* | 1/2018 | Wang .................... H04W 88/08 |
| 2018/0359597 A1 | 12/2018 | Lazar et al. |
| 2019/0138321 A1 | 5/2019 | Tokishige |
| 2021/0367857 A1 | 11/2021 | Ovadia |

* cited by examiner

TRAFFIC MANAGEMENT ARCHITECTURE

CROSS REFERENCE TO RELATED APPLICATIONS

This application claims priority of India Patent Application Serial Number 202031036244 filed Aug. 22, 2020.

BACKGROUND

The subject matter of this application relates to a traffic management system for a cable system.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
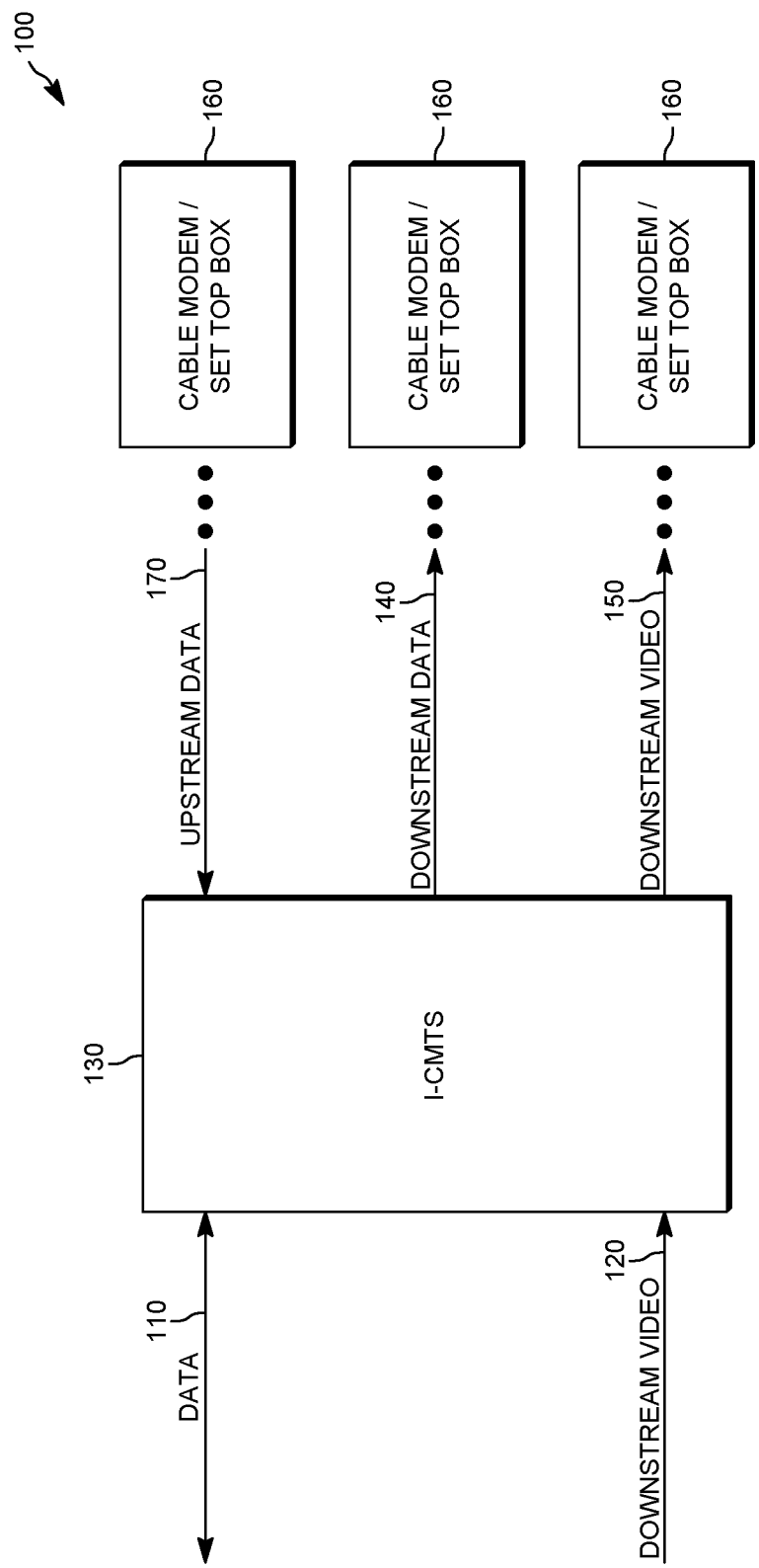
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
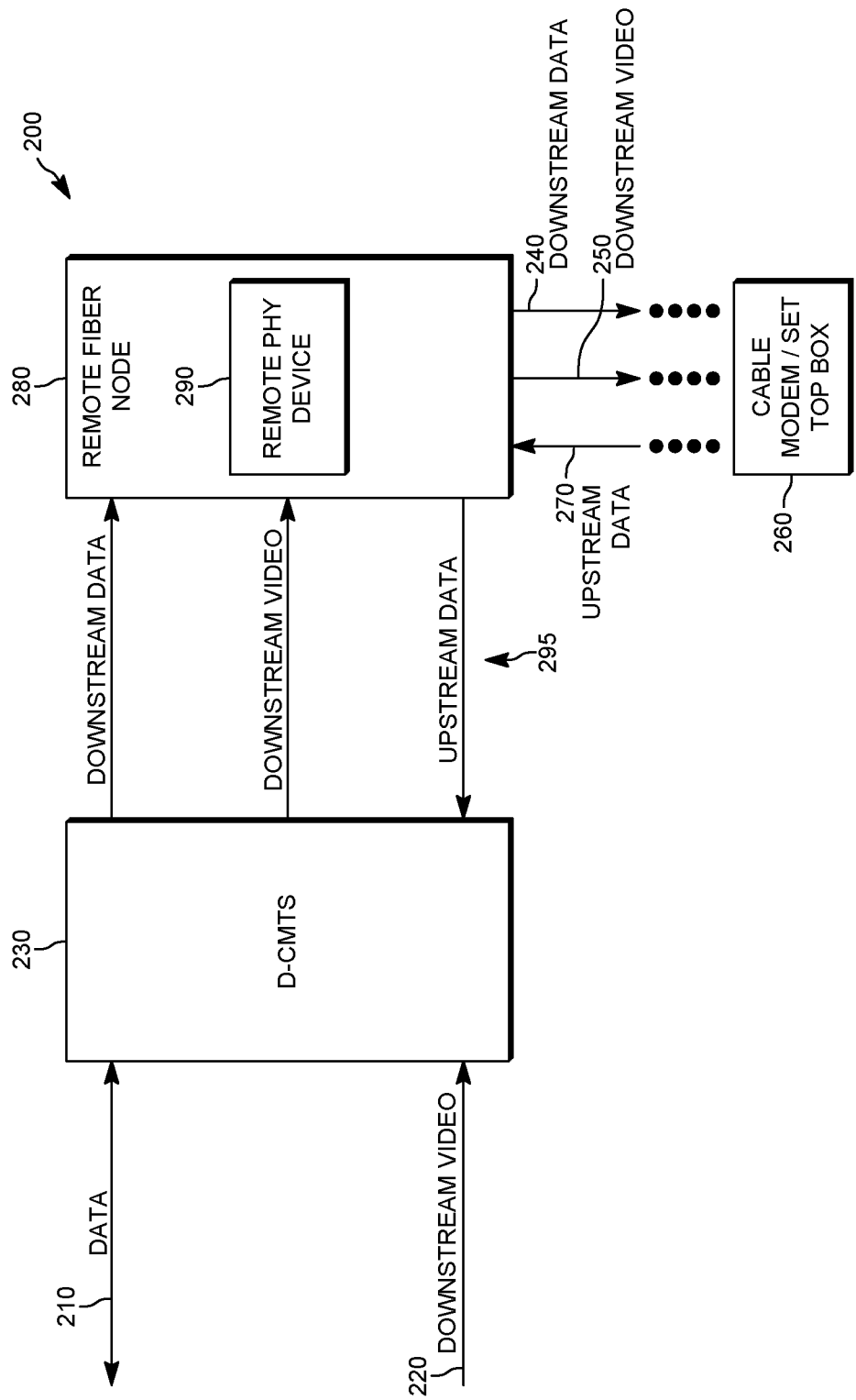
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general the R-PHY often includes the MAC and/or PHY layers of a portion of the system. The D-CMTS 200 may include a D-CMTS 230 (e.g., core) that includes data 210 that is sent and received over the Internet (or other network) typically in the form of packetized data. The D-CMTS 230 may also receive downstream video 220, typically in the form of packetized data from an operator video aggregation system. The D-CMTS 230 receives and processes the received data 210 and downstream video 220. A remote fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230.

By way of example, the remote PHY device 290 may convert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or analog optics, to digital for transmission to the D-CMTS 230. As it may be observed, depending on the particular configuration, the R-PHY may move all or a portion of the DOC SIS MAC and/or PHY layers down to the fiber node.

Figure 3:
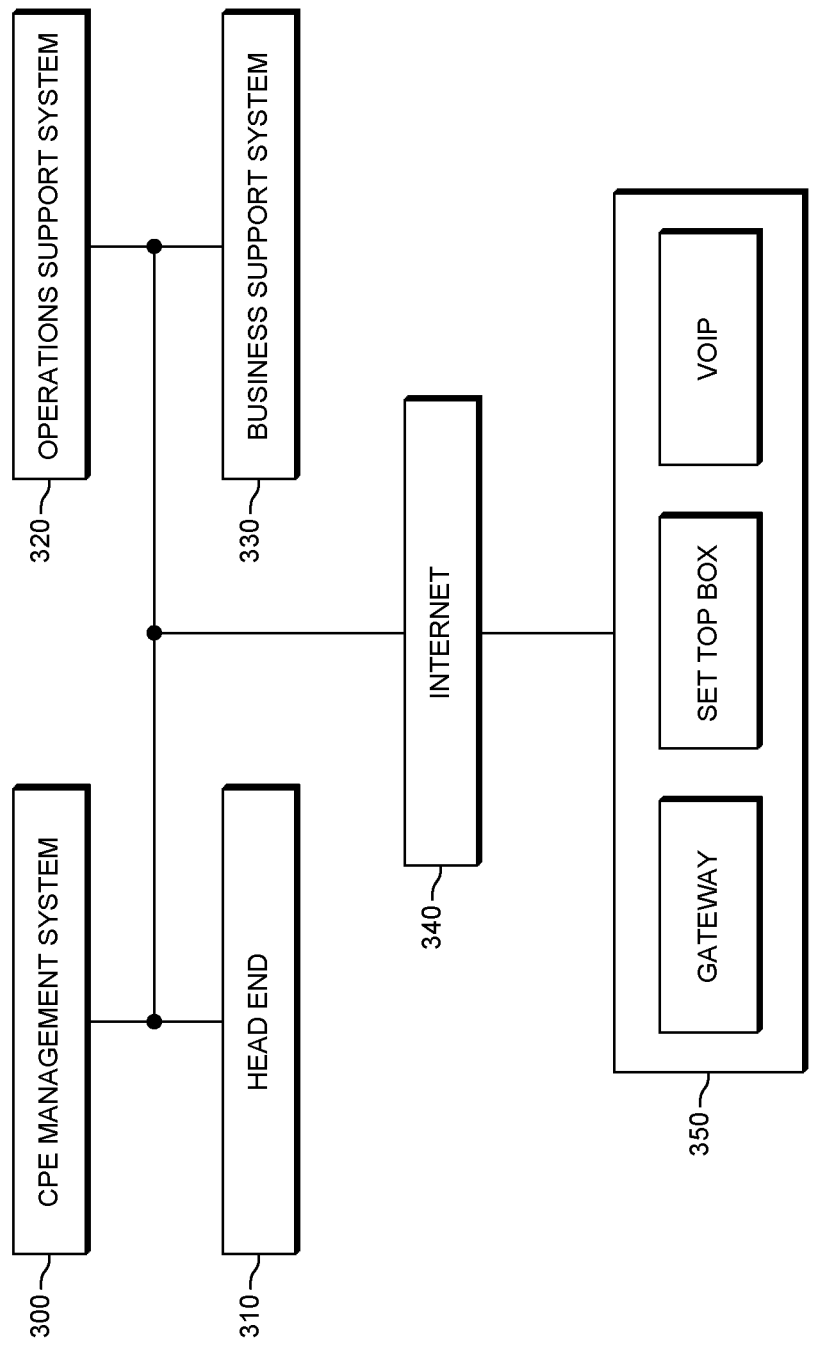
FIG. 3 illustrates a CPE management system interconnected with consumer premises equipment.

Referring to FIG. 3, the management of cable modems/set top boxes/gateways/etc. (referred to herein collectively as customer premise equipment) is a substantial burden for a cable networking system, due in large part, to the hundreds of thousands of customer premise equipment that needs to be managed. A customer premise equipment (CPE) management system 300 may be used to assist with the management, at least in part, to simplify the delivery, management, and support of services such as pay television, high speed Internet access, voice of Internet Protocol (VoIP), and connected home services. Further the CPE management system 300 should enable secure auto provisioning, configuration, management, monitoring, upgrading, and support for the customer premise equipment. The CPE management system 300 is suitable for working with large diverse populations of devices and the services that are provisioned on those devices. The CPE management system 300 works in combination with the head end 310. The CPE management system 300 may further include, or otherwise work in combination with, an operations support system 320 which supports back office activities, provisioning, maintaining customer services, etc. The CPE management system 300 may further include, or otherwise work in combination with, a business support system 330 which supports customer facing activities, such as billing, order management, customer relationship management, call center automation, trouble ticketing and service assurance, etc. The head end 310, the CPE management system 300, the operations support system 320, and the business support system 330 are interconnected to the Internet 340 and the customer premise equipment 350, such as a gateway, a voice of Internet protocol telephone, a set top box, etc. By way of example, the CPE management system 300 may use the Broadband Forum's TR-069, CPE WAN Management Protocol, CWMP Version: 1.4, March 2018; and TR-359, A Framework for Virtualization, October 2016; standards for remote device management and control, both of which are incorporated by reference herein in their entirety.

A substantial number of different systems may make use of the CPE management system 300 by using its application programming interface (API) to make requests to and receive responses therefrom to manage the CPE 350. However, with a substantial number of disparate systems making use of the CPE management system 300, each of which is generally operating in an autonomous manner with respect to each other, results in a tendency to overwhelm the CPE by receiving multiple requests resulting in a low success rate of receiving a suitable response. In addition, as a result of a reset of the CPE or otherwise as a result of an error within the CPE, the CPE is offline which results in time out errors to requests and no response being received.

By way of example, a customer may place a phone call to a customer support center for assistance with troubleshooting their gateway device. The customer support system may make a request to the CPE management system 300 to request diagnostic information from the customer's gateway device. Other systems may likewise be simultaneously making requests to the CPE management system 300 to request other information from the customer's gateway device. If the customer support system does not receive an immediate response or otherwise the request times out, the customer support center may make the request multiple times in a short succession in an attempt to obtain a faster response from the CPE management system 300, further exacerbating the problem. In many cases, the customer's gateway device is offline either as a result of an error or a rebooting process, both of which may be unknown to the customer support center which ensures that subsequent requests for information are going to fail. Often the result is that service calls take longer than necessary and the customer is more frustrated with the support.

In many environments, the customer has access to a web page portal from which the customer can control and configure, at least to a limited extent, their CPE. As a result, while the customer is working with the customer support center for assistance with troubleshooting their gateway device the customer, in a manner unknown to the customer support center, may be changing settings on their gateway or otherwise rebooting their gateway or otherwise unplugging and plugging back in their gateway, further exacerbating the problem.

Figure 4:
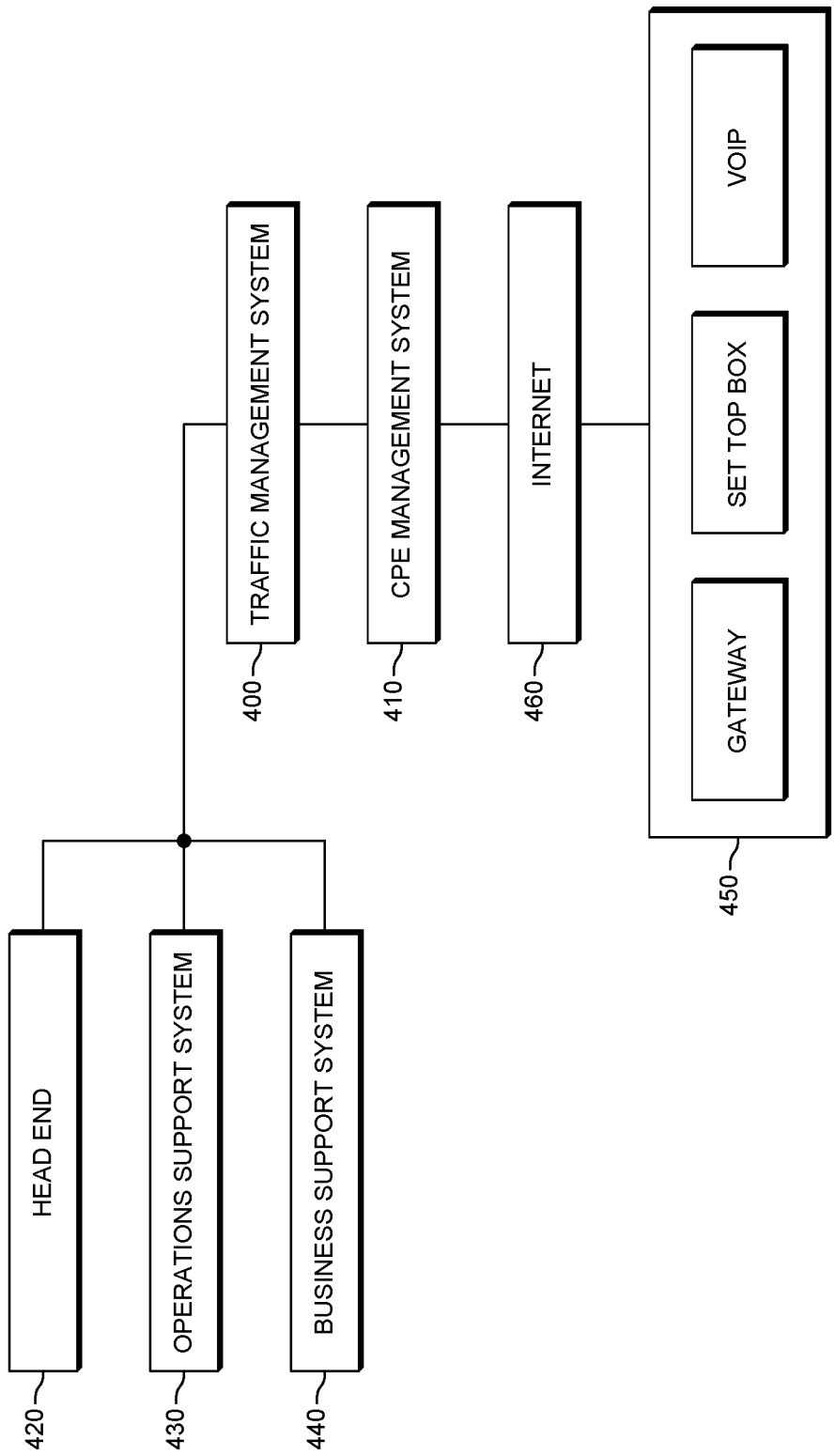
FIG. 4 illustrates a traffic management system and the CPE management system interconnected with consumer premises equipment.

Referring to FIG. 4, rather than redesigning each of the disparate services that make requests to the CPE management system 410 so that they make requests in a coordinated and managed fashion, it is desirable to include a centralized traffic management system 400 that receives requests from each of the disparate services, such as the head end 420, the operations support system 430, and the business support system 440. The traffic management system 400 manages the requests to the CPE management system 410, which in turn makes the requests to the customer premise equipment 450 through the Internet 460 and receives the responses from the customer premise equipment 450 through the Internet 460. The CPE management system 410, in turn, provides responses to the traffic management system 400, which in turn provides responses to the originating service. The traffic management system 400 receives the API related data traffic, typically as a result of updating a DNS address to route the API data traffic through the traffic management system 400.

Figure 5:
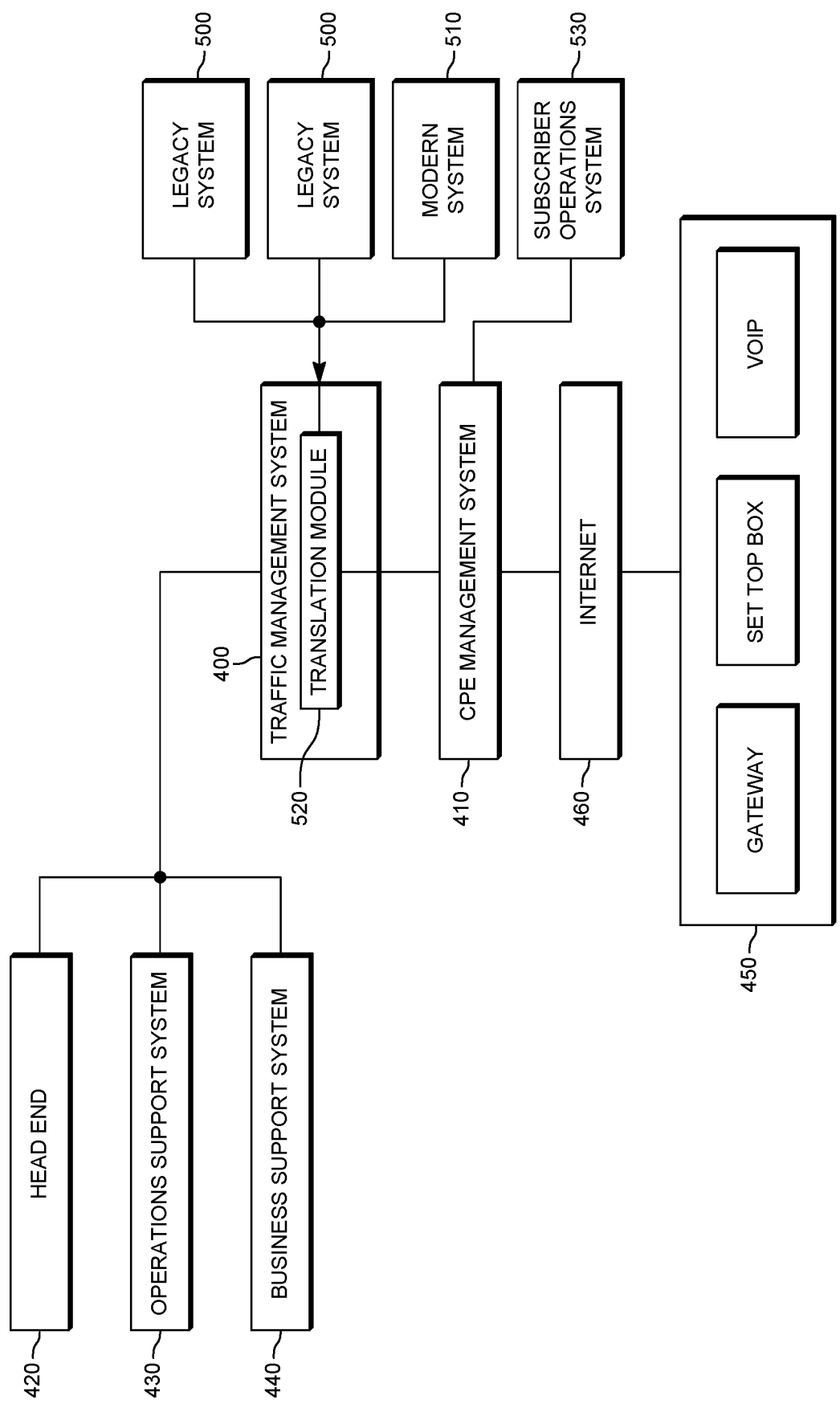
FIG. 5 illustrates the traffic management system and the CPE management system interconnected with consumer premises equipment together with legacy systems and subscriber operations.

Referring to FIG. 5, legacy systems 500 that use legacy API requests can provide such legacy API requests to the traffic management system 400 and receive API responses from the traffic management system 400. Modern systems 510 that use modern API requests can provide modern API requests to the traffic management system 400 and receive API responses from the traffic management system 400. If either the legacy API requests or the modern API requests are not suitable for the CPE management system 410 and/or the CPE 450, the traffic management system 400 may modify the API request, using a translation module 520, to be suitable for the CPE management system 410 and/or the CPE 450. The CPE management system 410 sends the translated request to the CPE 450 and receives a response from the CPE 450. The CPE management system 410 provides a response to the traffic management system 400. The traffic management system 400 may modify the response from the CPE management system 410 and provide a modified response to the requesting service in a manner consistent with the originating API. In this manner, in addition to not requiring updating of legacy systems, the traffic management system is effectively transparent to the requesting system while simultaneously enabling the use of the CPE management system 410 that may not otherwise support the legacy API requests. For example, the translation of the APIs is also especially suitable when managing different types of CPEs, such as a cable modem, a DSL modem, and/or a ADSL modem.

While the CPE management system 410 may provide requests to and receive responses from the CPE 450, the CPE 450 may also provide requests to and receive responses from other systems, such as a subscriber operations system 530. To accommodate this functionality, the traffic management system 400 provides requests to and receives responses from the CPE management system 410, which in some cases, provides requests to and receives responses from the other systems, such as a subscriber operations system 530. This facilitates the ability of the CPE management system 410 and the traffic management system 400 to gather data related to internal management systems.

Figure 6:
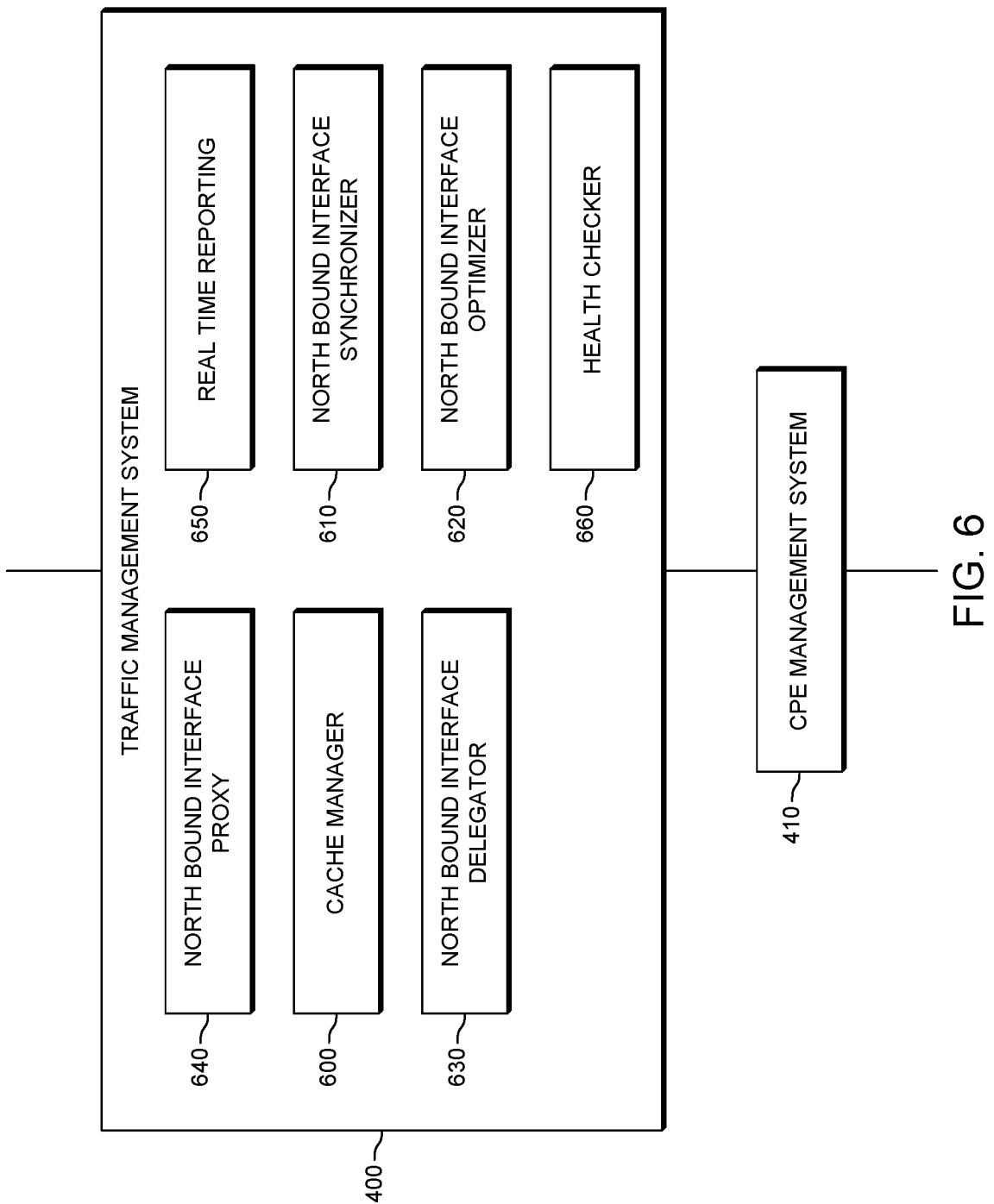
FIG. 6 illustrates the traffic management system.

Referring to FIG. 6, the traffic management system 400 is logically positioned in the network so that it may manage the API requests from a plurality of different systems that are intended to be provided to the CPE management system 410. Also, the traffic management system 400 is logically positioned so that it may manage the API responses from the CPE management system 410 to the plurality of different systems. The traffic management system 400 may include a cache manager 600. The cache manager 600, though selective caching of data, enables cached access to the CPE data for subsequent requests of the same data. The parameters from CPE devices are stored in a cache and provided in response to subsequent requests without having to make the request to the CPE, such as get live data requests. Detailed information regarding exemplary stored data is described later.

The traffic management system 400 regulates the north bound interface traffic from different OSS 430/BSS 440 systems in an optimized manner while improving the responsiveness of the system. The traffic management system 400 includes a platform that enables caching the responses to north bound interface requests and uses the responses to previous requests to respond to subsequent duplicate (at least in part) north bound interface requests. In this manner, the cache manager 600 proactively stores the data from the CPE to enable faster responses during subsequent requests, optimizes the north bound interface requests to the CPE management system 410 which reduces the load on the CPEs, synchronizes the CPE requests to avoid CPE contention, and provides real time reporting and statistics about the usage of the OSS/BSS north bound interface.

The cache manager 600 may include a plurality of modules therein, such as, a cache provider, a cache reader, and a cache writer. The cache provider stores and manages the CPE data, such as using a Redis in-memory data structure store used as a database, a cache, and a message broker. The cache reader may be a micro service responsible for reading the CPE data from the cache. The cache writer may be a micro service responsible for writing the CPE data into the cache which may include multiple trigger points. For example, one trigger point may be a response to a get live data request. For example, another trigger point may be a response to CPE Events, such as SPV (set parameter values). The cache writer may be agnostic to the trigger points and may be used by any service/event with the objecting of storing the CPE data.

In many situations, the API request provided to the CPE attempts to modify parameter settings of the device, but the changes to the parameter settings are not completed or otherwise the request is lost. In such cases, the CPE will not provide a response or otherwise will provide a response indicating that the parameter settings were not completed. In other situations, the API request provided to the CPE attempts to modify parameter settings of the device, and the changes to the parameter settings are properly completed. In such cases, the CPE will provide a response indicating that the parameter settings were properly completed. While the cache manager 600 may cache the requests that are being provided to the CPE, the cache manager 600 preferably caches the data that it receives originating from the CPE so that it can determine which modified parameter settings were completed and what the modified parameter settings are. The cache manager 600 may separate the data it receives into name-value pairs for each CPE, preferably in accordance with the Broadband Forum's TR-069, CPE WAN Management Protocol, CWMP Version: 1.4, March 2018. In this manner, the cache manager 600 may maintain a cache of the current parameter settings of the CPE, in the form of name-value pairs, that are provided or otherwise confirmed by the CPE in its response.

In this manner, the traffic management system 400 caches the data from the CPE that is included in the response to the CPE management system 410. With this cached data arranged in an organized fashion on a device basis by the traffic management system 400, subsequent requests received by the traffic management system 400 may be processed to determine what information is already available in the cache. For the information that is already available in the cache, the traffic management system 400 may respond with that information to the requesting service obtained from its cache. For the information that is not already available in the cache, the traffic management system 400 may modify the request to not request all or not request a portion of the information that is already available in the cache, and provide the modified request to the CPE management system 410. Upon receiving a response from the CPE management system 410 with the information obtained from the CPE 450, the traffic management system may provide a response to the requesting service with all of the information (a portion from the CPE and a portion from the cache), or the portion of the information not already provided in a previous response from its cache.

The traffic management system 400 may provide such selective API request processing for multiple systems, so that if different systems make a request for overlapping information that is available from the cache, the requested data may be provided in a responsive manner. Further, to increase the efficiency of the system, the traffic management system 400 may exclude from a subsequent request data that is currently being requested based upon a previous request from the same or different service. In this manner, overlapping data does not need to be requested multiple times from the same CPE 450, and the response from the CPE 450 may be provided as responsive data to multiple different services or the same service.

All or selected portions of the data maintained by the cache manager 600 may tend to become stale over time, or otherwise not representative, of the current state of the device. To reduce the likelihood that data is provided from the cache manager 600 that incorrectly reflects the current state of the device, the data within the cache manager 600 may include respectively time to live indication. The time to live may indicate an appropriate lifetime of selected data, which may be implemented as a counter or timestamp attached to or embedded in the data. Once a prescribed event count or timespan has elapsed, the data may be discarded or revalidated.

The cache manager 600 may use the time to live data to determine when the cache data should be refreshed, in whole or in part, from the CPE. For example, when the time to live indicates selected data has expired or otherwise due to expire soon, the traffic management system 400 may make a request to the CPE management system 410 to refresh the expired or expiring data. If desired, the cache manager 600 may clear the cache (in whole or in part) with respect to a particular device when the data is expired or expiring soon so that stale data is not provided to a requesting service. If desired, the cache manager 600 may clear the cache with respect to selected parameters of a particular device when a corresponding request is made to set the parameters for the particular device, so that stale data is not provided to a requesting service. If desired, the cache manager 600 may clear the cache with respect to selected data of a particular device when a selected event occurs, such as a set parameter value of the device, a reboot of the device, a diagnostic test of the device, etc., so that stale data is not provided to a requesting service.

The traffic management system 400 also preferably includes a "pass through" mode where the request is not processed in accordance with the cache manager 600. Further, if desired, the "pass through" mode may immediately pass through the request without being queued or otherwise.

The traffic management system 400 may include a north bound interface (NBI) synchronizer 610. The NBI synchronizer 610 regulates north bound interface traffic to reduce concurrent north bound interface requests to the same consumer premises equipment. The NBI synchronizer 610 manages client requests from end to end, and may be realized by implementing one or more micro services. The NBI synchronizer 610 leverages other services within the traffic management system 400 to process requests. The NBI synchronizer 610 acts as an orchestrator with principal functions including, for example; (1) consuming NBI requests from input queues; (2) instructing a NBI delegator for performing CPE operations (e.g., get live data); (3) instructing the cache manager to read/write data from/into the cache; (4) processing CPE events to queue the next north bound interface request from a job store; (5) write the NBI requests into the job store when the CPE is busy or otherwise offline; and (6) write the CPE data into an output queue when the NBI request is processed.

The traffic management system 400 may include a north bound interface (NBI) optimizer 620, preferably implemented as a micro service. The NBI optimizer 620 includes a framework which permits defining and applying optimizers for selected north bound interface requests, workflows, and request patterns. Moreover, the framework enables efficiently adding and/or modifying optimizers. The NBI optimizer 620 optimizes the API requests before delegating them to the CPE management system 410 to reduce the likelihood that the CPE will be overwhelmed. While the traffic management systems 400 cannot guarantee that the requesting system workflows are optimally implemented, the NBI optimizer 620 addresses such limitations by centralizing the optimization within the traffic management system 400 which can be applied to all systems by making the processing modifications at a single logical location. The NBI optimizations may include, for example; (1) granular requests; (2) multiplexing requests; and (3) reducing large get live data requests. The granular request introduces wildcard based input parameters and using a get parameter names reduces the payload size and response time. The multiplexing request by combining multiple requests into fewer requests results in a fewer number of device sessions, reduces the load on the south bound interface of the CPE management system, and reduces the response time. The reducing large get live data requests reduces the limitations associated with some consumer devices not being able to process get live data that involve large amounts of data. Such devices require special processing by splitting the large get live data request into multiple small get live data requests to avoid the device becoming unresponsive.

The NBI optimizer 620 and/or the north bound interface synchronizer 610 may also modify the requests based upon an internal state of the traffic management system 400, based upon the system making the request to the traffic management system 400, and/or content of the request being received. There are situations where it is desirable for the traffic management system 400 to combine multiple requests that are received into a single request that is provided to the CPE management system 410. For example, a first request for a first parameter, a second request for a second parameter, and a third request for a third parameter, may be suitable for being combined into a single request from the traffic management system 400 to the CPE management system 410 using a single request, where the response would include the first, the second, and the third parameter. There are situations where it is desirable for the traffic management system 400 to separate a single request that is received into multiple requests that are provided to the CPE management system 410. For example, a first request for a first parameter, a second parameter, and a third parameter, may be suitable for being separated into a first request for the first parameter, a second request for the second parameter, and a third request for the third parameter from the traffic management system 400 to the CPE management system 410 using a multiple requests, where the multiple responses would include the first parameter, the second parameter, and the third parameter.

The NBI optimizer 620 and/or the north bound interface synchronizer 610 may also modify the requests to be provided to the CPE management system 410 in a sequential fashion, by providing a first request to the CPE management system 410, receiving a response to the first request from the CPE management system 410, then a second request to the CPE management system 410, receiving a response to the second request from the CPE management system 410, and so forth. In this manner, the CPE which tends to have limited computational resources does not have to process parallel requests or otherwise a limited number of parallel requests.

The traffic management system 400 may include a north bound interface (NBI) delegator 630, preferably implemented as a micro service. The NBI delegator 630 delegates the requests to the CPE management system 410 north bound interface. The NBI delegator 630 provides an opportunity to apply additional switches to the input before submitting to the CPE management system 410 north bound interface, and adding additional error information before responding to devices providing the requests. The NBI delegator 630 interacts with the CPE management system 410 and leverages enhancements that are available in CPE management system 410 but that may not otherwise be used by north bound interface of other existing systems. The NBI delegator 630 may include additional error information with sub error code in the response before sending the response to the calling system in case of an API failure.

In this manner, the NBI delegator 630 improves the interaction with the CPE management system 410. For example, the NBI delegator 630 may receive an API request based upon a legacy API and the NBI delegator 630 modifies the API request to a different, preferably improved, manner of making the request for the information. Upon receipt of a response to the modified request, the NBI delegator 630 modifies the response to conform to the expected response from the device providing the legacy API.

The traffic management system 400 may include a north bound interface (NBI) proxy 640, preferably implemented as a micro service. The NBI proxy 640 intercepts the north bound interface requests to route through the traffic management system 400.

The traffic management system 400 also preferably includes a health checker 660. The health checker 660 determines whether the CPE is likely online or offline. The health checker 660 may determine if the CPE is offline in any suitable manner. For example, the health checker 660 may use data or the lack thereof in a network protocol level, such as a HTTP request made in a manner apart from the CPE management system 410. For example, the health checker 660 may use requests based upon Broadband Forum's TR-069, CPE WAN Management Protocol, CWMP Version: 1.4, March 2018. For example, the health checker 660 may use previously requested commands being provided to the CPE. For example, one of the requested commands may be a reboot of the CPE which typically takes approximately 5 minutes. Accordingly, during the subsequent 5 minutes from the issuance of the reboot, the CPE may be considered to be offline. For example, the health checker 660 may use the anticipated duration to respond to a particular request. For example, particular API requests may require a long time to respond and during this time the health checker 660 may indicate that the CPE device is busy rather than being offline.

Figure 7:
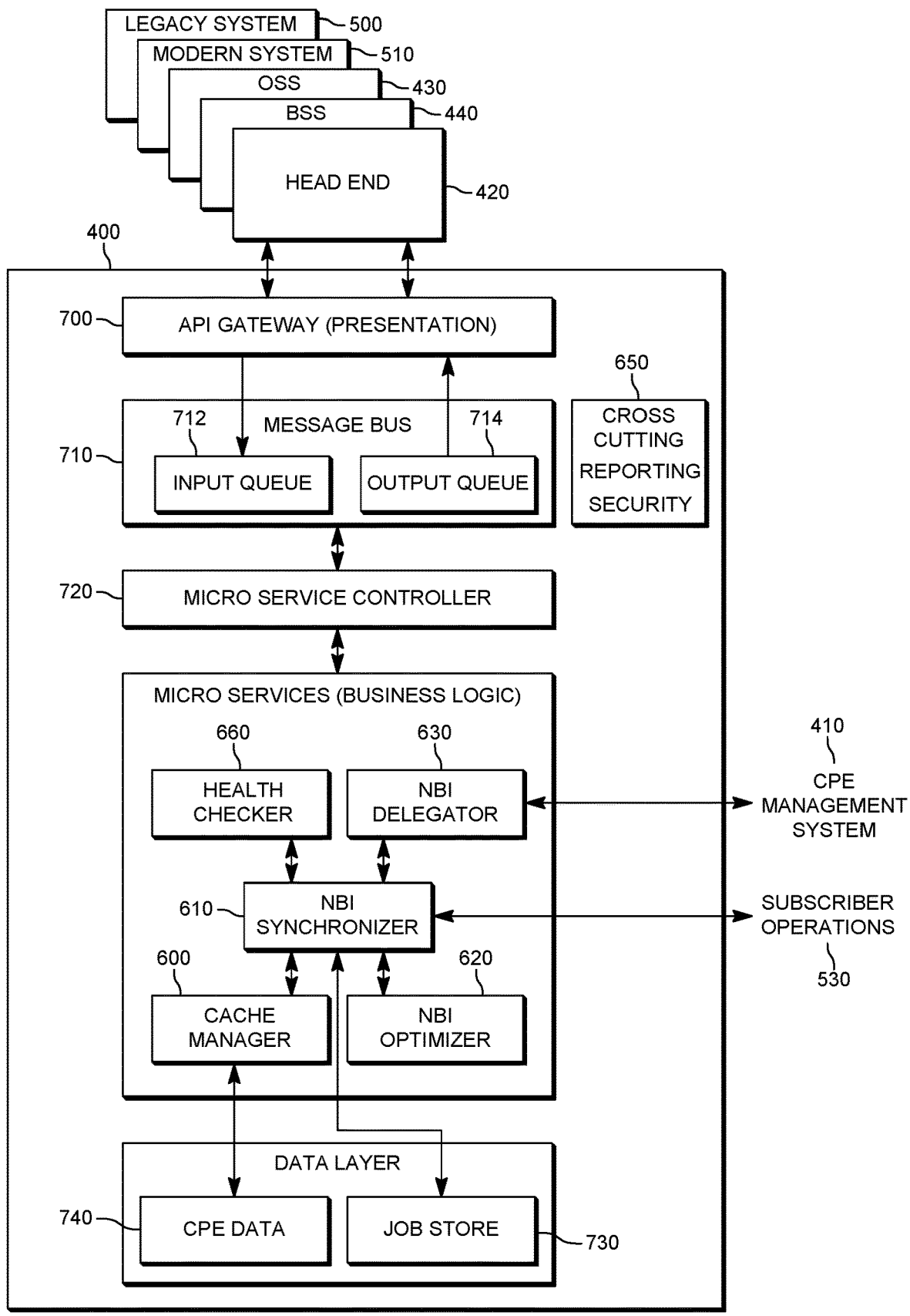
FIG. 7 illustrates a logical view of the traffic management system.

Referring to FIG. 7, a logical view of the traffic management system 400 together with its layers is illustrated. An API gateway 700 is the single-entry point for all the north bound interface systems of the traffic management system 400. The API gateway 700 intercepts the north bound interface requests that are coming in from OSS/BSS/etc. systems and places them in their respective input queue (job queue) for processing. The API gateway 700 also validates the requester to make sure only authorized clients can access the traffic management system 400. Once the job is completed the traffic management system 400 takes the response from output queue and delegates the response to the respective source system. The API gateway 700 is preferably the only component of the traffic management system 400 exposed to the "outside world". The remaining components and/or services are preferably not directly accessible to any external components. Real time reporting is also assessed through the API gateway 700 as web application. The traffic management system 400 also may internally access an ELK stack (i.e., Elasticsearch, Logstash, and Kibana stack), a Redis Database (REmote Dictionary Server), or other sources.

Latency can increase as a result of all of the micro services that are employed. As previously described, there are some API requests that are preferably fulfilled by the API gateway to reduce the latency. In this manner, selected API requests may avoid the message bus if latency is an important factor for a particular API request. Accordingly, the API gateway may selectively process the API request by the micro services, such as the cache manager, or otherwise the API gateway may bypass selected micro services, such as the cache manager, and have the request more immediately forwarded to the CPE management system 410. In a similar manner, API responses from the CPE management system 410 may be selectively processed in a manner that bypasses selected micro services, such as the cache manager, and have the request more immediately forwarded to the requested system.

A message bus 710 allows the traffic management system 400 to handle the NBI requests in an asynchronous manner. Once the NBI request is received by the traffic management system 400, and posts a message in the input queue 712, a thread associated with the NBI request goes to a sleep mode until the request is processed. This ensures only threads that are doing some processing are active at any given time to make more optimal use of processing resources. NBI requests are placed in the input queue 712. The input queue 712 may be distributed by operation (such as on a per source basis). This facilitates the message bus to process requests for each of the sources using a different path. The NBI requests other than get live data and reboot are processed in the message bus by posting them in a default input queue. An output queue 714 is used to place the NBI response before a proxy delivers the response to the requesting system. Preferably, there is only one output queue 714 to hold the response for all kinds of NBI requests from different input queues 712.

A micro service controller 720 provides for service registration and discovery. All the micro services defined in the traffic management system 400 registers them self to this component so that other services and clients can discover them. The micro service controller 720 keeps track of the availability of the micro services that are registered and provides an overview of the load on each service. This enables each micro service to scale independently vertically and/or horizontally.

The job store 730 is an entity in the caching system to enable storing the NBI requests which are retrieved later for submitting when the CPE becomes available for serving the next request. It is a data component with no functionality/ services associated or implemented. This component is used by the NBI Synchronizer 610 while processing the NBI requests.

CPE data 740 is an entity in the caching system to enable caching the CPE data. It is a data component with no functionality associated with it. This component is used by NBI Synchronizer while processing the NBI requests to the CPE. A device event notification handler also uses this component to update data when it receives a value change or a successful SPV response.

The traffic management system 400 may include real time reporting 650, preferably implemented as a micro service. The real time reporting 650 provides reports about the call flow and identifies any anomalies in the requesting system in a proactive manner. The real time reporting 650 is preferably provided through the API gateway 700 in the form of a user interface.

Figure 8:
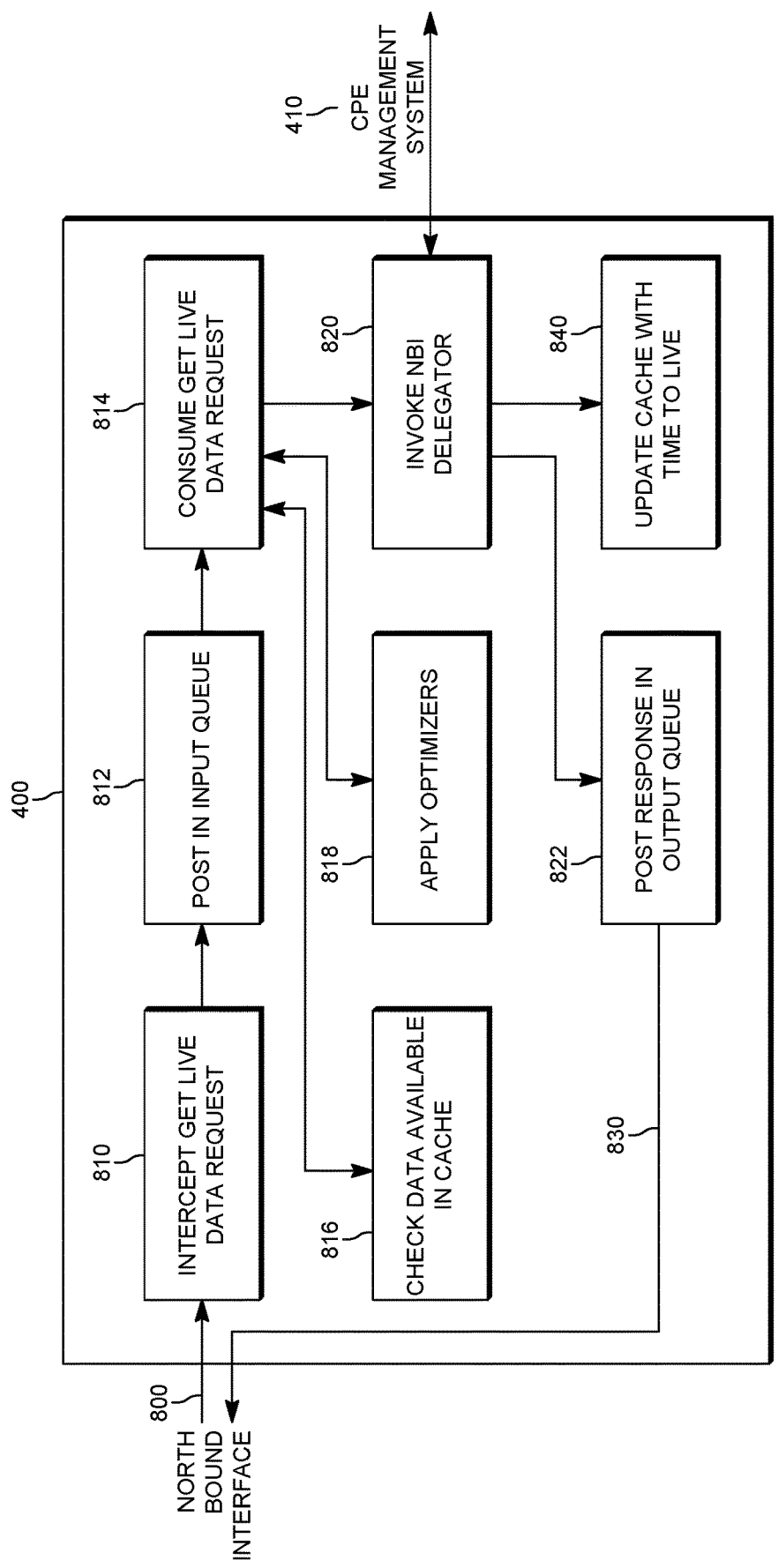
FIG. 8 illustrates a first time get live data request.

Referring to FIG. 8, an exemplary first use case involves the event of a first time get live data request for a CPE. By way of example, a call center agent may start troubleshooting a particular CPE. The call center agent initiates a health check for the CPE, which results in a north bound support system invoking a get live data request 800 which is intercepted 810 by the traffic management system 400. The get live data request 800 is posted in the input queue 812. The get live data request 800 in the input queue 812 is consumed 814. The traffic management system 400 checks to determine if the request can be served with cached data or not 816. The traffic management system 400 checks to determine if any optimizer should be applied for the given request, and applies any such optimizers as applicable 818. The request is ready for submission to the CPE management system 410 and forwarded to the north bound interface delegator 820. The north bound interface delegator 820 checks to determine if the CPE is online and not busy, prior to submitting the request. If the CPE is busy serving another request, the request may be put in the job store for submitting the request at a later time when the CPE is not busy. If the CPE is offline, a response may be provided back to the north bound support system invoking the get live data request 800 that the CPE is offline, and optionally the request may be put in the job store for submitting the request at a later time when the CPE is online. If the CPE is online and not busy, the north bound interface delegator 820 sends the request to the CPE management system 410 and posts the response in the output queue 822. The get live data response is sent to the north bound support system invoking the get live data request 830. The cache is updated with the response from the CPE together with time to live data 840.

Figure 9:
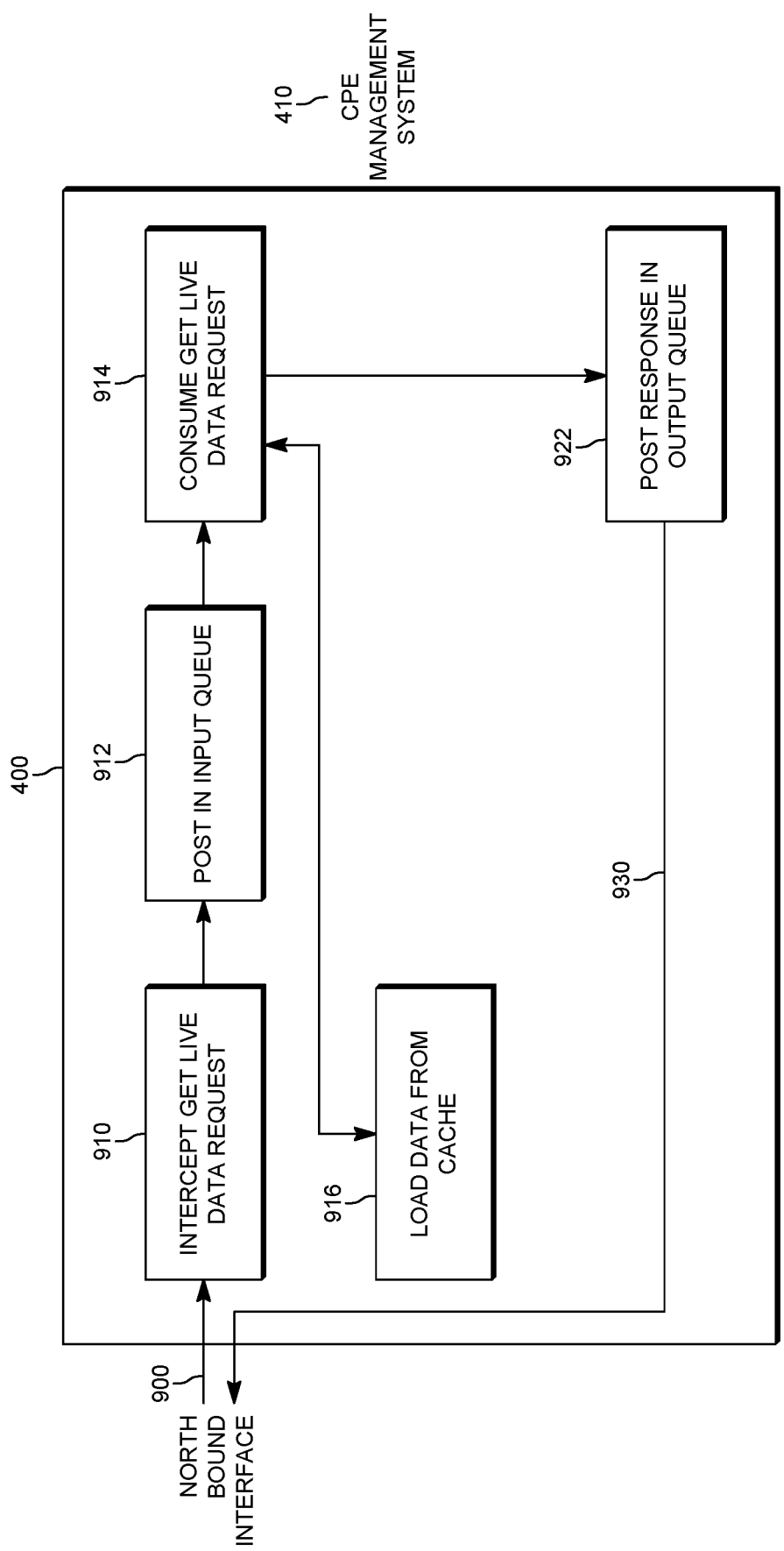
FIG. 9 illustrates subsequent duplicate get live data requests.

Referring to FIG. 9, an exemplary second use case involves the event for subsequent duplicate get live data requests for a CPE. By way of example, a call center agent may be troubleshooting a particular CPE through multiple different north bound support systems. The call center agent initiates a health check for the CPE though one north bound support system, where a health check for the CPE is already requested by another or the same north bound support system, which results in an additional north bound support system invoking a get live data request 900 which is intercepted 910 by the traffic management system 400. In some cases, the agent clicks on a refresh button repeatedly which may result in duplicate live data requests by the same north bound support system. The get live data request 900 is posted in the input queue 912. The get live data request 900 in the input queue 912 is consumed 914. The traffic management system 400 checks to determine if the request can be served with the cached data and loads the responsive cached data 916. When the responsive data can be provided from the cache, the response is posted in the output queue 922. The get live data response is sent to the north bound support system invoking the get live data request 930. In some cases, the traffic management system 400 is aware there is an outstanding get live data request to the CPE, and may wait until it is completed and a response is provided so that the data received in response can be used for multiple outstanding responses. In this manner, the subsequent get live data request may not need to be provided to the CPE management system 410.

Figure 10:
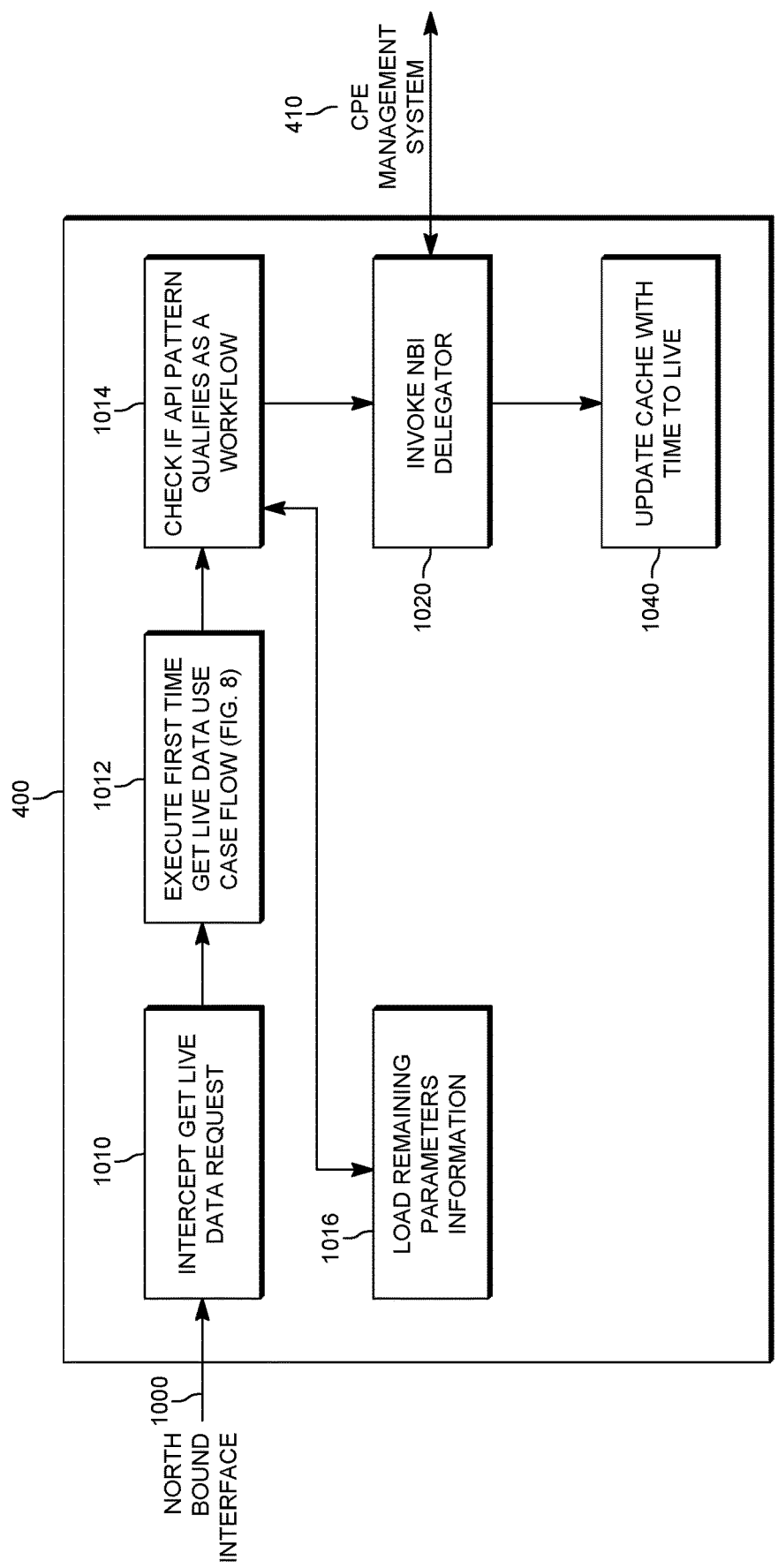
FIG. 10 illustrates preloading of CPE data into a cache.

Referring to FIG. 10, an exemplary third use case involves the event of pre-loading CPE data into cache for a CPE. By way of example, a call center agent may start troubleshooting a particular CPE. The call center agent initiates a health check for the CPE, which results in a north bound support system invoking a get live data request 1000 which is intercepted 1010 by the traffic management system 400. The traffic management system 400 performs the get live data process as outlined in FIG. 8. 1012. The traffic management system then determines if the request from the north bound support system belongs to a workflow that is suitable for additional processing 1014. If the request from the north bound support system does not belong to a workflow then the processing for this request terminates. If the request from the north bound support system belongs to the workflow then a request to load additional CPE parameters is initiated and forwarded to the north bound interface delegator 1020. The north bound interface delegator 1020 checks to determine if the CPE is online and not busy, prior to submitting the request. If the CPE is busy serving another request, the request may be put in the job store for submitting the request at a later time when the CPE is not busy. If the CPE is offline, a response may be provided back to the north bound system invoking the get live data request 1000 that the CPE is offline, and optionally the request may be put in the job store for submitting the request at a later time when the CPE is online. If the CPE is online and not busy, the north bound interface delegator 1020 sends the request to the CPE management system 410. The cache is updated with the response from the CPE together with time to live data 1040. The request related to the workflow is for additional data from the CPE or to refresh the data already received from the CPE, so that the cache may be more complete for future requests. In the workflow case, the heuristics may be omitted, especially in the case that the request is to other non-CPE systems, such as a customer database with account information.

Figure 11:
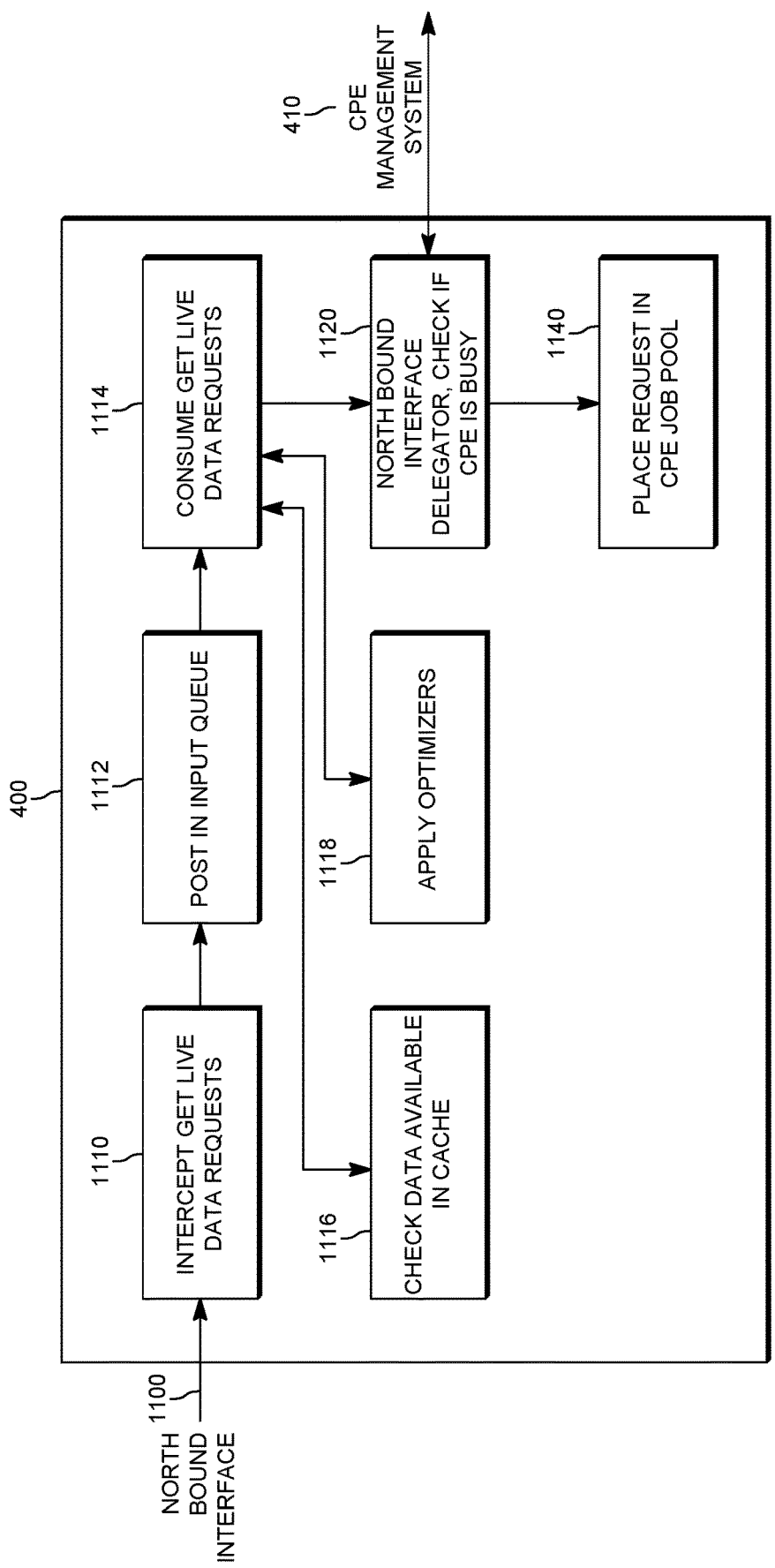
FIG. 11 illustrates concurrent get live data requests.

Referring to FIG. 11, an exemplary fourth use case involves the event for concurrent get live data requests for a CPE. By way of example, a call center agent may start troubleshooting a particular CPE. The call center agent initiates multiple health checks for the same CPE, which results in a north bound support system invoking multiple get live data request 1100 which are intercepted 1110 by the traffic management system 400. The get live data requests 1100 are posted in the input queue 1112. The get live data requests 1100 in the input queue 1112 are consumed 1114. The traffic management system 400 checks to determine if the request can be served with the cached data or not 1116. The traffic management system 400 checks to determine if any optimizer should be applied for the given request, and applies any such optimizers as applicable 1118. The request is ready for submission to the CPE management system 410 and forwarded to the north bound interface delegator 1120. The north bound interface delegator 1120 checks to determine if the CPE is online and not busy, prior to submitting the request. If the CPE is busy serving another request, the request may be put in the job store 1140 for submitting the request at a later time when the CPE is not busy. If the CPE is offline, a response may be provided back to the north bound system invoking the get live data request 1100 that the CPE is offline, and optionally the request may be put in the job store for submitting the request at a later time when the CPE is online. If the CPE is online and not busy, the north bound interface delegator 1120 sends each of the requests to the CPE management system 410 in a selective manner and posts the response in the output queue. The get live data responses are sent to the north bound support system invoking the get live data requests. The cache is updated with the response from the device together with time to live data. The selective processing may be a parallel request (multiple pending at the CPE) or a serial request (only one pending at a time at the CPE).

Figure 12:
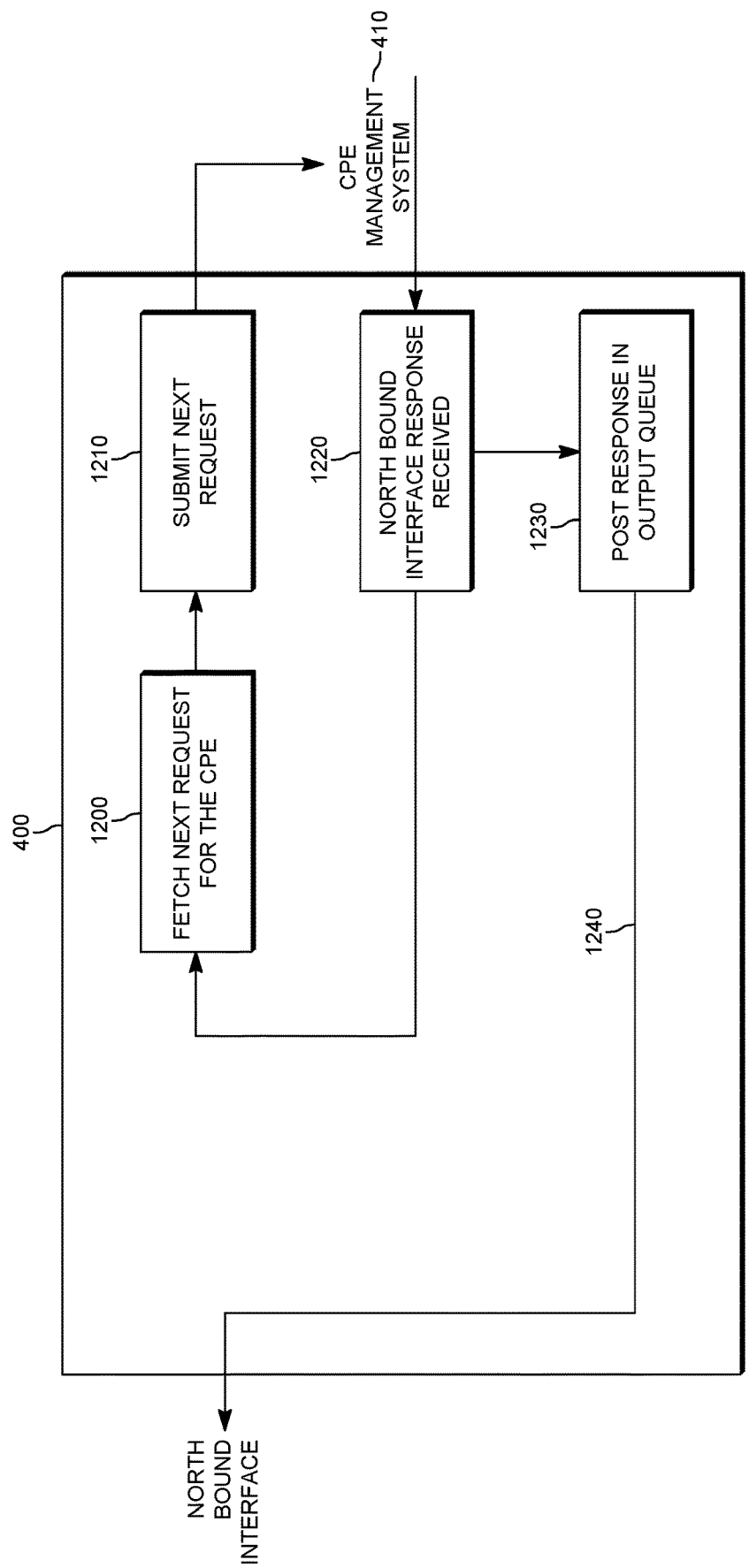
FIG. 12 illustrates a next get live data request form a job store.

Referring to FIG. 12, an exemplary fifth use case involves the event of a next get live data request from a job store for a CPE. The CPE completes one get live data request and provides a response to the traffic management system 400 by the CPE management system 410. The north bound interface delegator 1220 receives the response from the CPE management system 410 and posts the response in the output queue 1230. The get live data response is sent to the north bound support system invoking the get live data request 1240. A previous request is stored in the job store and the traffic management system 400 fetches the next job stored in the job store 1200. The fetched next job is submitted as the next request 1210 (by the north bound interface delegator) to the CPE management system 410. The north bound interface delegator checks to determine if the CPE is online and not busy, prior to submitting the request. If the CPE is busy serving another request, the request may be put in the job store for submitting the request at a later time when the CPE is not busy. If the CPE is offline, a response may be provided back to the north bound support system invoking the get live data request 1240 that the CPE is offline, and optionally the request may be put in the job store for submitting the request at a later time when the CPE is online. If the CPE is online and not busy, the north bound interface delegator sends the request to the CPE management system 410 and posts the response in the output queue 1230. In this manner, a serial process of request, response, request, response, etc. may be achieved.

Figure 13:
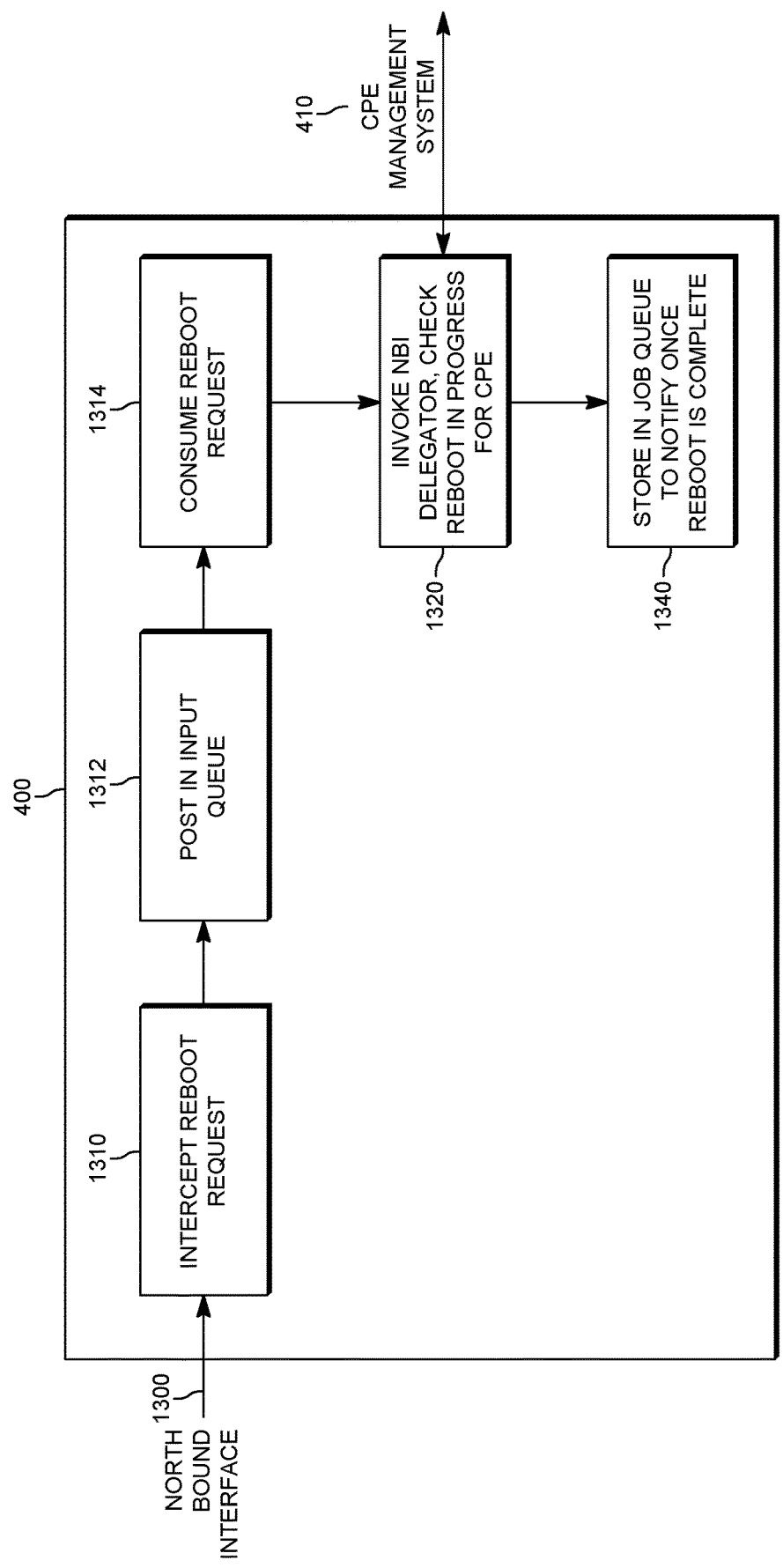
FIG. 13 illustrates multiple reboot requests.

Referring to FIG. 13, an exemplary sixth use case involves the event of multiple reboot requests for a CPE. By way of example, a call center agent may start troubleshooting a particular CPE. The call center agent initiates an initial reboot for the CPE which is in progress. The call center agent initiates yet another reboot for the CPE, which results in a north bound support system invoking a reboot request 1300 which is intercepted 1310 by the traffic management system 400. The reboot request 1300 is posted in the input queue 1312. The reboot request 1300 in the input queue 1312 is consumed 1314. The north bound interface delegator 1320 checks to determine if the CPE is online prior to submitting the request. If the CPE is offline as a result of a previous reboot, the reboot request may be stored in a job queue to notify once the reboot is complete 1340. One the rebooting process is complete, a response may be provided for both of the reboot requests while only invoking a single reboot request. In this manner, improved management of the CPE device may be achieved by limiting the number of sequential reboot requests.

Figure 14:
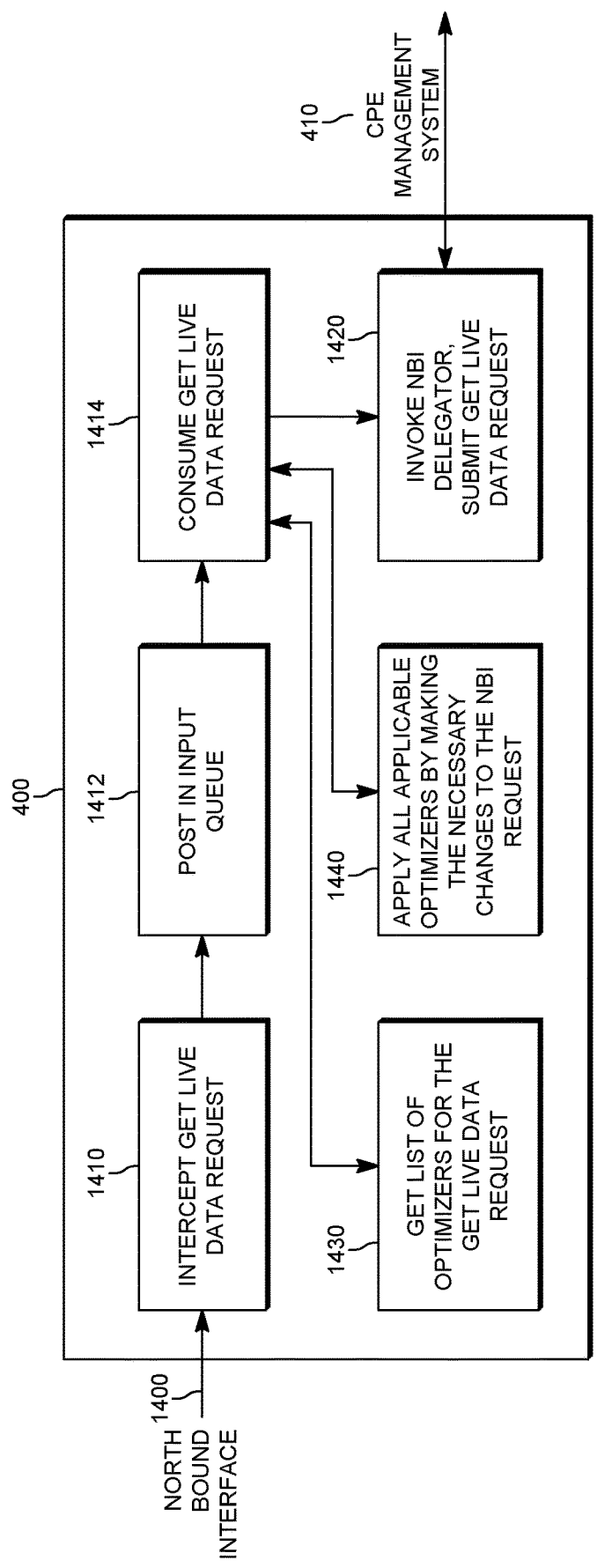
FIG. 14 illustrates optimizing NBI requests.

Referring to FIG. 14, an exemplary seventh use case involves optimizing north bound interface requests for a CPE. By way of example, a call center agent may start troubleshooting a particular CPE. The call center agent initiates a health check for the CPE, which results in a north bound support system invoking a get live data request 1400 which is intercepted 1410 by the traffic management system 400. The get live data request 1400 is posted in the input queue 1412. The get live data request 1400 in the input queue 1412 is consumed 1414. The traffic management system 400 checks to determine if the request can be served with cached data or not. It may be desirable to modify the request to another more efficient or otherwise tailored to the information that is not locally available. The traffic management system 400 gets a list of optimizers for the get live data request 1430. The traffic management system 400 applies all applicable optimizers by making the necessary changes to the north bound interface request 1440. The request may be modified as appropriate for different requests. The request is ready for submission to the CPE management system 410 and forwarded to the north bound interface delegator 1420. The north bound interface delegator 1420 checks to determine if the CPE is online and not busy, prior to submitting the request. If the CPE is busy serving another request, the request may be put in the job store for submitting the request at a later time when the CPE is not busy. If the CPE is offline, a response may be provided back to the north bound support system invoking the get live data request 1400 that the CPE is offline, and optionally the request may be put in the job store for submitting the request at a later time when the CPE is online. If the CPE is online and not busy, the north bound interface delegator 1420 sends the request to the CPE management system 410 and posts the response in the output queue. The get live data response is sent to the north bound support system invoking the get live data request. The cache is updated with the response from the CPE together with time to live data.

Figure 15:
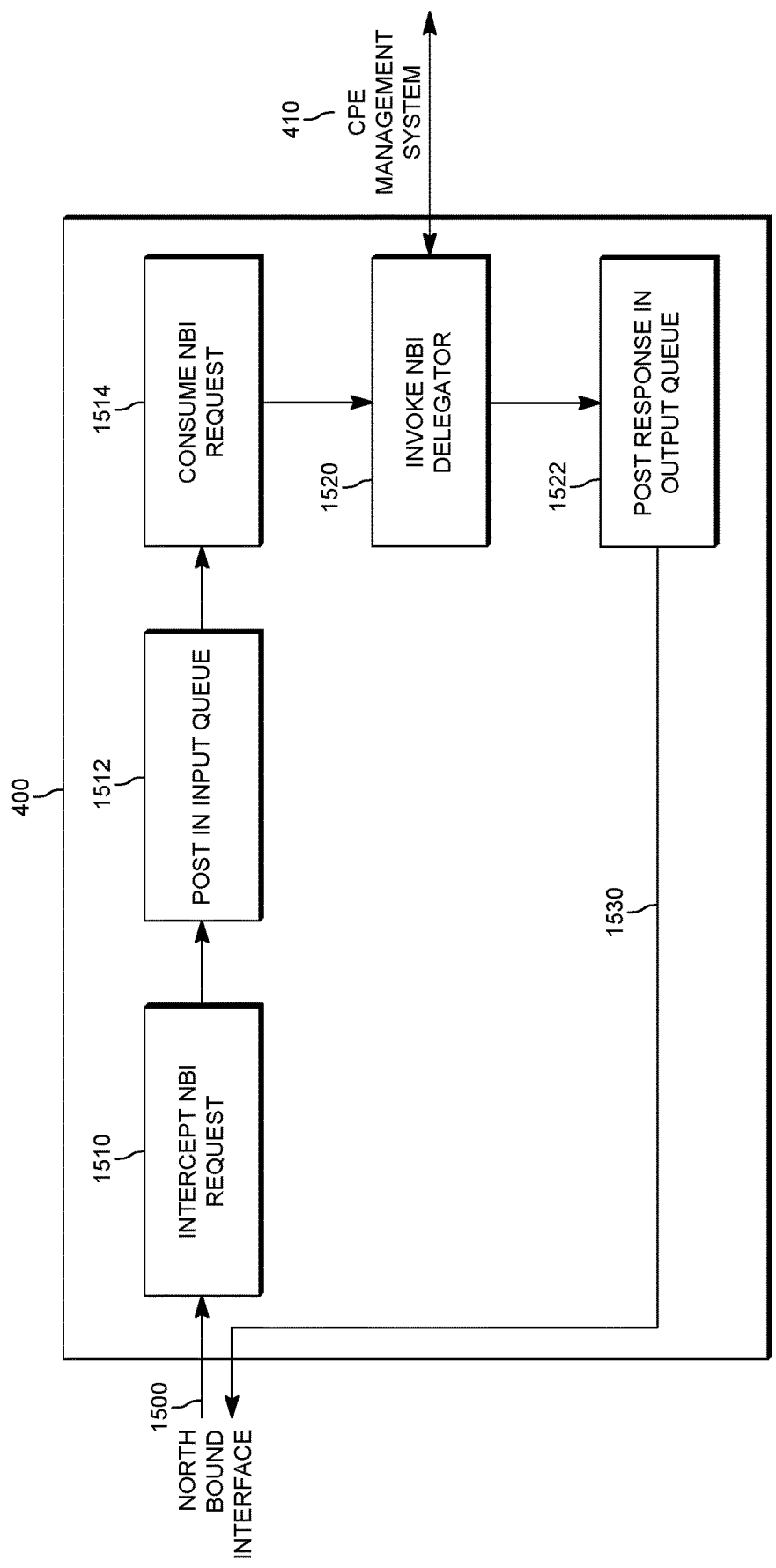
FIG. 15 illustrates requests other than get live data and reboot.

Referring to FIG. 15, an exemplary eighth use case involves requests other than get live data and reboot for a CPE. By way of example, a call center agent may start troubleshooting a particular CPE. The call center agent initiates a request (other than get live data or reboot) from the CPE, which results in a north bound support system invoking a data request 1500 which is intercepted 1510 by the traffic management system 400. The data request 1500 is posted in the input queue 1512. The data request 800 in the input queue 1512 is consumed 1514. When the request is ready for submission to the CPE management system 410 it is forwarded to the north bound interface delegator 1520. The north bound interface delegator 1520 checks to determine if the CPE is online and not busy, prior to submitting the request. If the CPE is busy serving another request, the request may be put in the job store for submitting the request at a later time when the CPE is not busy. If the CPE is offline, a response may be provided back to the north bound support system invoking the data request 1500 that the CPE is offline, and optionally the request may be put in the job store for submitting the request at a later time when the CPE is online. If the CPE is online and not busy, the north bound interface delegator 1520 sends the request to the CPE management system 410 and posts the response in the output queue 1522. The get live data response is sent to the north bound support system invoking the get live data request 1530.

Figure 16:
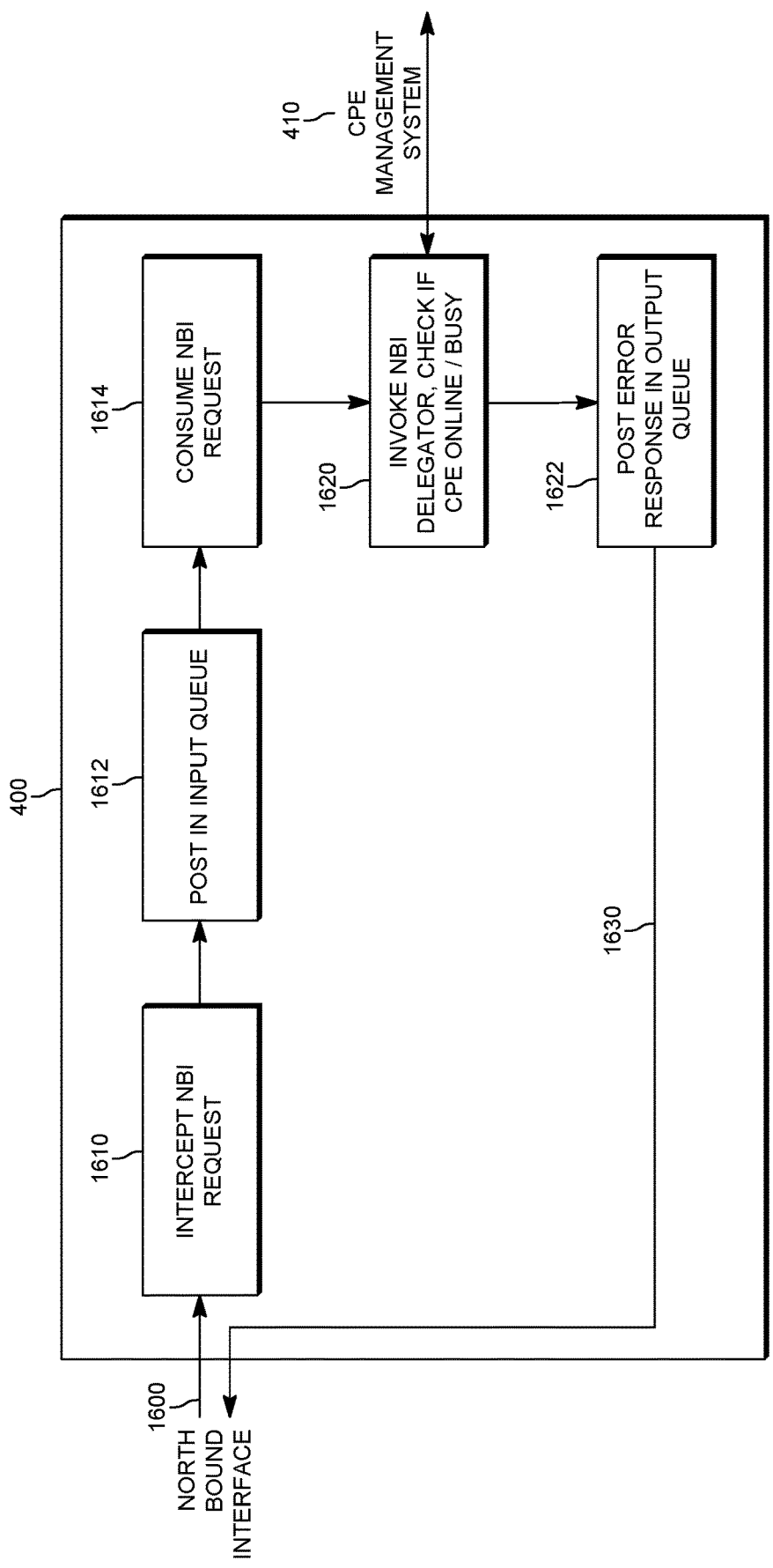
FIG. 16 illustrates a request when the CPE is offline or busy.

Referring to FIG. 16, an exemplary ninth use case involves a request when for a CPE when it is offline or otherwise busy. By way of example, a call center agent may start troubleshooting a particular CPE. The call center agent initiates a health check for the CPE, which results in a north bound support system invoking a data request 1600 which is intercepted 1610 by the traffic management system 400. The data request 1600 is posted in the input queue 1612. The data request 1600 in the input queue 1612 is consumed 1614. When the request is ready for submission to the CPE management system 410 it is forwarded to the north bound interface delegator 1620. The north bound interface delegator 1620 checks to determine if the CPE is online and not busy, prior to submitting the request. If the CPE is busy serving another request, the request may be put in the job store for submitting the request at a later time when the CPE is not busy. If the CPE is offline, a response may be provided back to the north bound support system invoking the data request 1600 that the CPE is offline, and optionally the request may be put in the job store for submitting the request at a later time when the CPE is online. If the CPE is offline or busy, the north bound interface delegator 1620 posts in the output queue 1622 that there is an error. The data response is sent to the north bound support system invoking the data request 1630.

Figure 17:
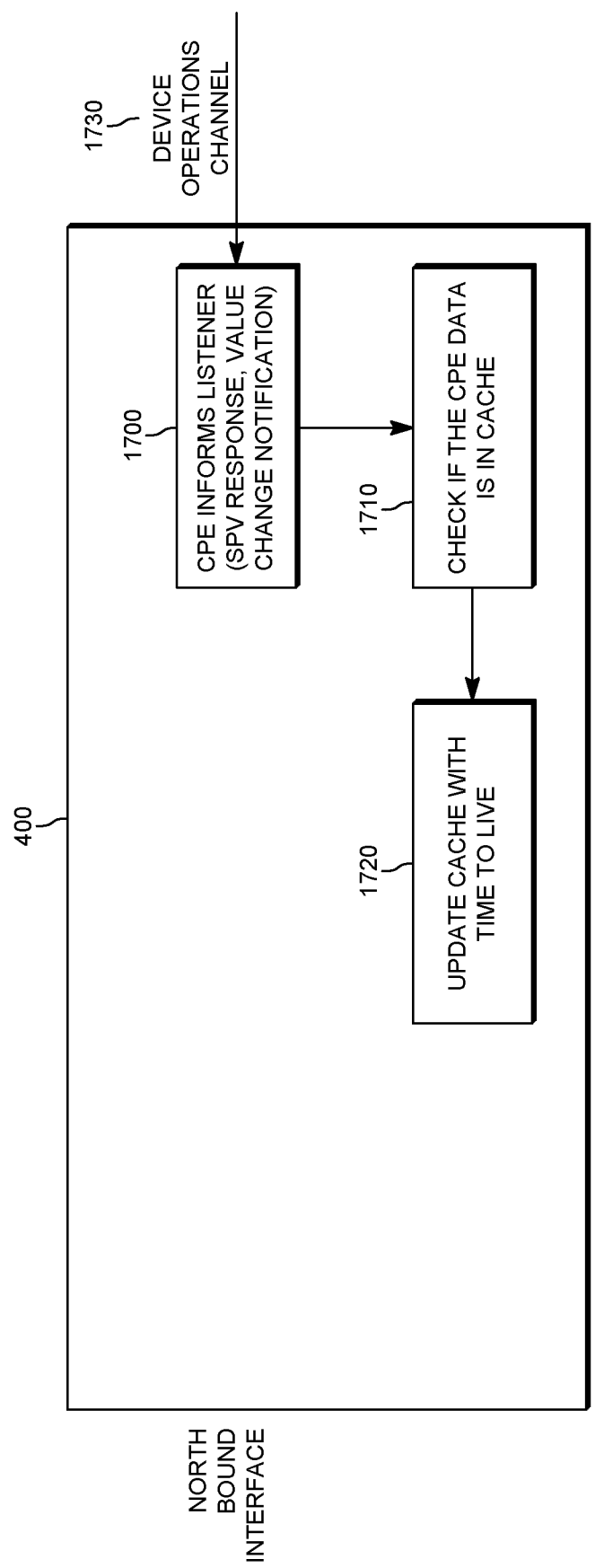
FIG. 17 illustrates update the cache.

Referring to FIG. 17, an exemplary tenth use case involves updating the cache with CPE data change notifications. This is an internal use case which starts when the CPE sends inform to the device operations channel 1730. The CPE listener 1700 checks if the inform is a set parameter value (SPV) response or a value change notification 1700. If it is, then the traffic management system 400 checks if the CPE data is in the cache 1710. If the data is not in the cache, then the cache is updated with the data and time to live 1720.

In some cases, the traffic management system 400 may schedule and autonomously update some or all of the parameters stored in its cache for selected CPEs. The updating may be based upon time to live, if desired. In this manner, the data in the cache may be maintained sufficiently fresh to provide data to a requesting system.

An exemplary list of parameters used in the system is listed below, which may be supplemented or otherwise modified, as desired. The parameters include CPE data, diagnostic data, and workflow data.

Master Objects
  InternetGatewayDevice.DeviceInfo. InternetGatewayDevice.DeviceInfo.X_000005_
    LEDStatus.
  InternetGatewayDevice.IPPingDiagnostics.
  InternetGatewayDevice.LANDeviceNumberOfEntries
    InternetGatewayDevice.LANDevice.
  InternetGatewayDevice.LANDevice.1.Hosts.
    InternetGatewayDevice.LANDevice.1.Hosts.Host.
  InternetGatewayDevice.LANDevice.1.Hosts.
    HostNumberOfEntries
  InternetGatewayDevice.LANDevice.1.
    LANEthernetInterfaceConfig.
  InternetGatewayDevice.LANDevice.1.
    LANEthernetInterfaceNumberOfEntries
  InternetGatewayDevice.LANDevice.1.
    LANHPNAInterfaceConfig.
  InternetGatewayDevice.LANDevice.1.
    LANHostConfigManagement.
  InternetGatewayDevice.LANDevice.1.
    LANHostConfigManagement.IPInterface.
  InternetGatewayDevice.LANDevice.1.
    WLANConfiguration.
  InternetGatewayDevice.LANDevice.1.X_000005_
    Wireless.Enable
  InternetGatewayDevice.LANDevice.1.X_00D09E_
    HPNAv3InterfaceConfig.
  InternetGatewayDevice.Services.VoiceService.
  InternetGatewayDevice.Services.VoiceService.1.
    PhyInterface.
  InternetGatewayDevice.Services.VoiceService.1.
    VoiceProfile.
  InternetGatewayDevice.Services.X_000005_
    PowerSupplyService.1.
  InternetGatewayDevice.Services.X_00D09E_
    PowerSupply Service.
  InternetGatewayDevice.Services.X_00D09E_
    RemoteBridgeService.
  InternetGatewayDevice.Services.X_00D09E_
    RemoteBridgeServiceNumberOfEntries
  InternetGatewayDevice.Time.CurrentLocalTime InternetGatewayDevice.WANDevice.
  InternetGatewayDevice.X_000005_WiFi.Airties.Steering
  InternetGatewayDevice.X_00D09E_IGMP.
  DeviceInfo
  Description
  EnabledOptions
  FirstUseDate
  HardwareVersion
  Manufacturer
  ManufacturerOUI
  ModelName
  ProductClass
  SerialNumber
  SoftwareVersion
  UpTime
  InternetGatewayDevice.LANDevice.1.
LANHPNAInterfaceConfig.[1,2,3]
  PerformanceMonitoring.Channels. PerformanceMonitoring.Nodes.
  PerformanceMonitoring.Nodes.Current. PerformanceMonitoring.Nodes.CurrentEnd
  PerformanceMonitoring.Nodes.CurrentNumberOfEntries
  PerformanceMonitoring.Nodes.CurrentStart
  InternetGatewayDevice.LANDevice.1.
LANHPNAInterfaceConfig.[1,2,3] Status
  InternetGatewayDevice.LANDevice.1.
WLANConfiguration. [1,2,5,6,7] Enable
PreSharedKey.1.X_000005_KeyPassphrase
PreSharedKey.1.X_00D09E_KeyPassphrase
  RadioEnabled
  SSID
  SSIDAdvertisementEnabled
  Status
  X_0060D3_SSIDBCastEnabled
    X_00D09E_SSIDBCastEnabled
  InternetGatewayDevice.Services.VoiceService.l.
VoiceProfile.[1,2]
  Enable
  Line.1.CallState
  Line.1.DirectoryNumber
  Line.1.Enable Line.1.SIP.AuthUserName Line.1.Stats.CallsDropped
Line.1.Status
   Line.1.VoiceProcessing.EchoCancellationEnable
   SIP.RegisterExpires
SIP.RegisterRetryInterval
SIP.RegistrarServer
SIP.RegistrarServerPort
SIP.UserAgentDomain
InternetGatewayDevice.WANDevice.[1,11,12]
WANCommonInterfaceConfig.PhysicalLinkStatus
WANCommonInterfaceConfig.TotalPacketsReceived
WANCommonInterfaceConfig.TotalPacketsSent
WANCommonInterfaceConfig.WANAccessType
WANConnectionDevice.1.WANIPConnection.
WANConnectionDevice.1.WANIPConnection.1.
   ExternalIPAddress
WANConnectionDevice.1.WANIPConnection.2.
   ExternalIPAddress WANDSLDiagnostics.
WANDSLDiagnostics.BITSpsds
WANDSLDiagnostics.HLOGpsus
WANDSLDiagnostics.QLNpsds
WANDSLDiagnostics.SNRpsds
WANDSLDiagnostics.X_0060D3_BITSpsus
   WANDSLDiagnostics.X_0060D3_HLOGpsds
WANDSLDiagnostics.X_0060D3_SelectedLine
   WANDSLDiagnostics.X_00D09E_BITSpsus
WANDSLDiagnostics.X_00D09E_HLOGpsds
WANDSLInterfaceConfig.DownstreamAttenuation
WANDSLInterfaceConfig.DownstreamCurrRate
WANDSLInterfaceConfig.DownstreamMaxRate
WANDSLInterfaceConfig.DownstreamNoiseMargin
WANDSLInterfaceConfig.DownstreamPower WAND-
   SLInterfaceConfig.LastShowtimeStart
WANDSLInterfaceConfig.LineNumber
WANDSLInterfaceConfig.QuarterHourStart WAND-
   SLInterfaceConfig.Stats.QuarterHour
WANDSLInterfaceConfig.Stats.QuarterHour.ATUC-
   CRCErrors
WANDSLInterfaceConfig.Stats.QuarterHour.ATUCFE-
   CErrors
WANDSLInterfaceConfig.Stats.QuarterHour.CRCErrors
WANDSLInterfaceConfig.Stats.QuarterHour.Errored-
   Secs
WANDSLInterfaceConfig.Stats.QuarterHour.FECErrors
WANDSLInterfaceConfig.Stats.QuarterHour.InitErrors
WANDSLInterfaceConfig.Stats.QuarterHour.InitTim-
   eouts
WANDSLInterfaceConfig.Stats.QuarterHour.LInit
WANDSLInterfaceConfig.Stats.QuarterHour.LOF
WANDSLInterfaceConfig.Stats.QuarterHour.Link-
   Retrain
WANDSLInterfaceConfig.Stats.QuarterHour.LossOf-
   Framing
WANDSLInterfaceConfig.Stats.QuarterHour.SeverelyEr-
   roredSecs
WANDSLInterfaceConfig.Stats.QuarterHour.X_
   0060D3_LossofSignalFailures
WANDSLInterfaceConfig.Stats.QuarterHour.X_
   0060D3_UnavailableSeconds
WANDSLInterfaceConfig.Stats.QuarterHour.X_
   00D09E_LossOfMarginFailures
WANDSLInterfaceConfig.Stats.QuarterHour.X_
   00D09E_LossOfSignalFailures
WANDSLInterfaceConfigStats.QuarterHour.X_
   00D09E_UnavailableSeconds
WANDSLInterfaceConfig.Status
WANDSLInterfaceConfig.TotalStart
WANDSLInterfaceConfig.UpstreamCurrRate
WANEthernetInterfaceConfig.

Figure 18:
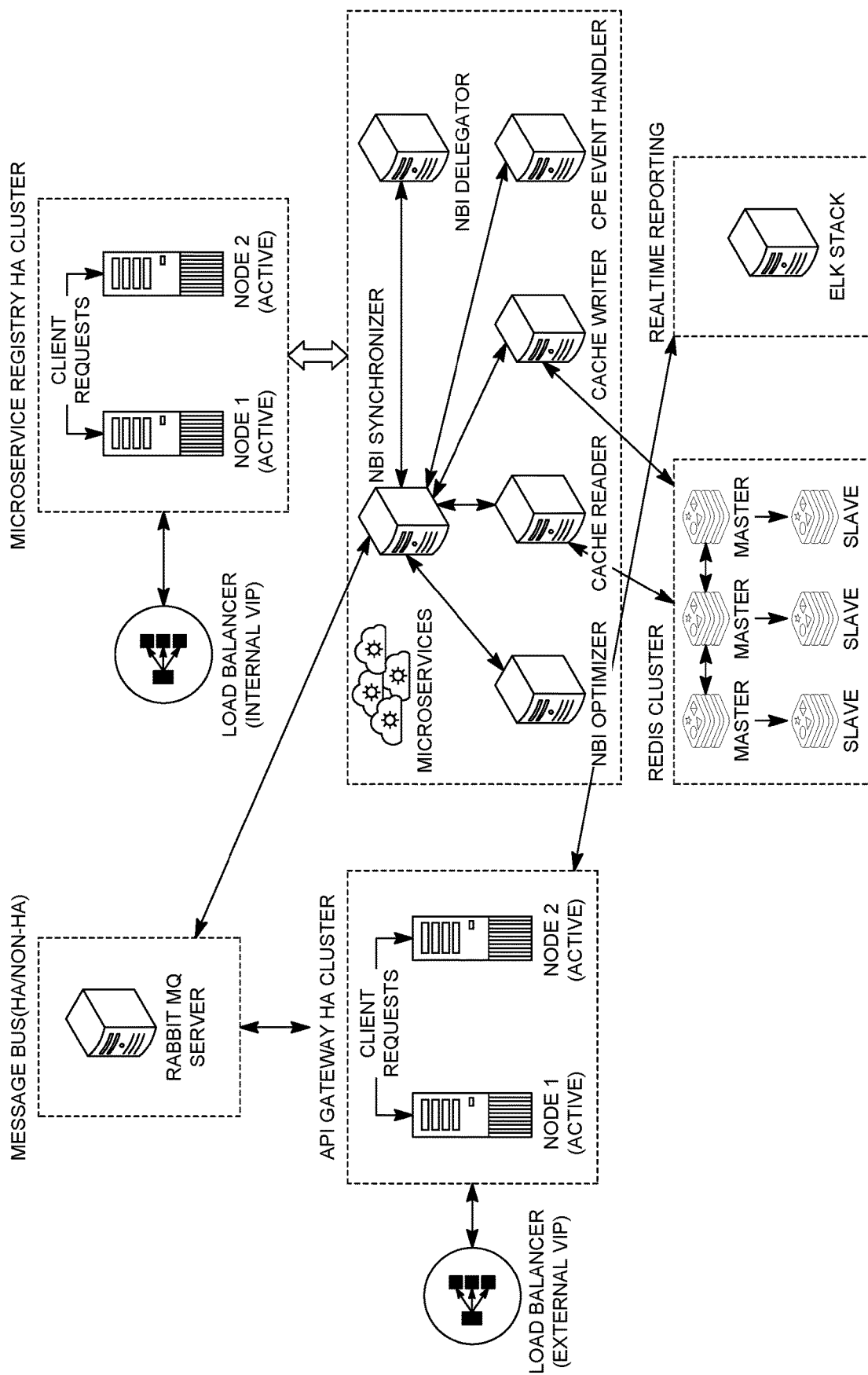
FIG. 18 illustrates a traffic management system.

Referring to FIG. 18, an exemplary deployment of the traffic management system is illustrated. The deployment may include the use of docker and Kubernetes, if desired.

The traffic management system may also maintain information related to network based data activities, which are accessible through the user interface. The traffic management system may maintain information related to end to end connections and reliability. The traffic management system may maintain information related to interhost communications. The traffic management system may maintain information related to data representation and encryption. The traffic management system may maintain information related to network process to application. By way of example, the traffic management system may store details on the packets and/or payloads that are provided and/or received. Heuristics may be applied to the data by the traffic management system and/or an external system based upon the data obtained. For example, the heuristics may indicate on an individual north bound support system basis the parameters being requested, the times of day, the average response time, payloads provided, payloads received, API used, etc. For example, the heuristics may indicate on a CPE basis the parameters being requested, the time of day, the average response time, payloads provided, payloads received, API used, etc. Also, the heuristics may correlate the data being requested from a particular CPE and a particular north bound support system.

The heuristics, in general, enable a clearer view of the flow of the data. For example, the traffic management system and/or the external system may determine an error rate based upon the requests, a success rate based upon the request, a response time based upon the requests, and a size of the response based upon the requests. This information may further be refined based upon particular APIs, a particular north bound support system, particular groups of north bound support systems, and comparisons between particular groups of north bound support systems. For example, based upon the error rates and usage patterns, the traffic management system may selectively increase the throughput and reduce error rates by selectively using different APIs and different times of days.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A traffic management system for managing requests to a customer premises equipment (CPE), the management system comprising:
   a memory; and
   a processor configured to execute an application stored on the memory to cause the management system to:
      receive a request to the CPE, wherein the request is a get live data request from a north bound support system;
      forward the request to a north bound interface (NBI) delegator of the management system;
      send, by the NBI delegator, the request to the CPE;
      receive a response to the request from the CPE, wherein the response is a get live data response for the get live data request;
      cache the response to the request, wherein the response comprises CPE data;
      send, to the north bound support system, the cached response in response to an additional request requesting the CPE data of the cached response.

2. The traffic management system of claim 1, wherein, the sending by the NBI delegator, the get live data request is based on a determination that a CPE is online and not busy.

3. The traffic management system of claim 1, wherein the processor is further configured to execute the application to cause the traffic management system to:
   determine that an optimizer should be applied for the get live data request;
   apply the optimizer to the get live data request; and
   wherein forwarding the get live data request to the NBI delegator comprises forwarding the optimized get live data request.

4. The traffic management system of claim 1, wherein the processor is further configured to execute the application to cause the traffic management system to:
   receive a duplicate get live data request from another north bound support system; and
   after the get live data response for the get live data request to the north bound support system is sent, send the get live data response to the another north bound support system.

5. The traffic management system of claim 1, wherein the processor is further configured to execute the application to cause the traffic management system to at least one of:
   update the cache with the get live data response and time to live data.

6. The traffic management system of claim 1, wherein the processor is further configured to execute the application to cause the traffic management system to:
   determine that the CPE is offline or busy servicing the get live data request;
   store the additional request in a job store based on determining that the CPE is offline or busy; and
   after sending the get live data response, send, by the NBI delegator, the additional request to the CPE.

7. The traffic management system of claim 1, wherein the processor is further configured to execute the application to cause the traffic management system to:
   post the get live data response to an output queue for sending to the north bound support system.

8. A method for a traffic management system for managing requests to a customer premises equipment (CPE) management system, the method comprising:
   receiving a request to the CPE, wherein the request is a get live data request from a north bound support system;
   forward the request to a north bound interface (NBI) delegator of the management system;
   sending, by the NBI delegator, the request to the CPE;
   receiving a response to the request from the CPE, wherein the response is a get live data response for the get live data request;
   caching the response to the request, wherein the response comprises CPE data;
   sending, to the north bound support system, the cached response in response to an additional request requesting the CPE data of the cached response.

9. The method of claim 8, sending, by the NBI delegator, the get live data request is based on a determination that a CPE is online and not busy.

10. The method of claim 8, the method further comprising:
    determining that an optimizer should be applied for the get live data request;
    applying the optimizer to the get live data request; and
    wherein forwarding the get live data request to the NBI delegator comprises forwarding the optimized get live data request.

11. The method of claim 8, the method further comprising:
    receiving a duplicate get live data request from another north bound support system; and
    after the get live data response for the get live data request to the north bound support system is sent, sending the get live data response to the another north bound support system.

12. The method of claim 8, the method further comprising:
    determining that the CPE is offline or busy servicing the get live data request;
    storing an additional get live data request is a job store based on determining that the CPE is offline or busy; and
    after sending the get live data response, sending, by the NBI delegator, the additional get live data request to the CPE management system.

13. The method of claim 8, the method further comprising:
    updating the cache with the get live data response and time to live data.

14. The method of claim 8, the method further comprising:
    posting the get live data response to an output queue for sending to the north bound support system.

15. A non-transitory memory of a traffic management system for storing an application that, when executed by a processor of the management system, causes the management system to perform one or more operations comprising:

receiving a request to the CPE, wherein the request is a get live data request from a north bound support system;

forward the request to a north bound interface (NBI) delegator of the management system;

sending, by the NBI delegator, the request to the CPE;

receiving a response to the request from the CPE, wherein the response is a get live data response for the get live data request;

caching the response to the request, wherein the response comprises CPE data; and sending, to the north bound support system, the cached response in response to an additional request requesting the CPE data of the cached response.

16. The non-transitory memory of claim 15, wherein the sending, by the NBI delegator, the get live data request is based on a determination that a CPE is online and not busy.

17. The non-transitory memory of claim 15, wherein the application, when further executed by the processor, causes the traffic management system to perform the one or more operations further comprising:

determining that an optimizer should be applied for the get live data request;

applying the optimizer to the get live data request; and wherein forwarding the get live data request to the NBI delegator comprises forwarding the optimized get live data request.

18. The non-transitory memory of claim 15, wherein the application, when further executed by the processor, causes the traffic management system to perform the one or more operations further comprising:

receiving a duplicate get live data request from another north bound support system; and after the get live data response for the get live data request to the north bound support system is sent, sending the get live data response to the another north bound support system.

19. The non-transitory memory of claim 15, wherein the application, when further executed by the processor, causes the traffic management system to perform the one or more operations further comprising:

determining that the CPE is offline or busy servicing the get live data request;

storing an additional get live data request is a job store based on determining that the CPE is offline or busy; and after sending the get live data response, sending, by the NBI delegator, the additional get live data request to the CPE management system.

20. The non-transitory memory of claim 15, wherein the application, when further executed by the processor, causes the traffic management system to perform the one or more operations further comprising:

updating the cache with the get live data response and time to live data; and posting the get live data response to an output queue for sending to the north bound support system.

* * * * *